US012568494B2

(12) United States Patent
Zhang et al.

(10) Patent No.: US 12,568,494 B2
(45) Date of Patent: Mar. 3, 2026

(54) METHOD AND APPARATUS FOR RECEIVING AND TRANSMITTING DATA AND CONTROL INFORMATION

(71) Applicant: Samsung Electronics Co., Ltd., Suwon-si (KR)

(72) Inventors: Sa Zhang, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 438 days.

(21) Appl. No.: 18/148,715

(22) Filed: Dec. 30, 2022

(65) Prior Publication Data

US 2023/0217439 A1     Jul. 6, 2023

(30) Foreign Application Priority Data

Dec. 31, 2021    (CN) .......................... 202111659947.X

(51) Int. Cl.
*H04W 72/1273*          (2023.01)
*H04W 72/11*            (2023.01)
*H04W 72/51*            (2023.01)

(52) U.S. Cl.
CPC ........ *H04W 72/1273* (2013.01); *H04W 72/11* (2023.01); *H04W 72/51* (2023.01)

(58) Field of Classification Search
CPC . H04W 72/1273; H04W 72/11; H04W 72/51; H04W 72/0453; H04W 8/24; H04L 5/0044; H04L 5/0091; H04L 5/0053
USPC .................................................. 370/329, 312
See application file for complete search history.

(56) References Cited

U.S. PATENT DOCUMENTS

| | | | | |
|---|---|---|---|---|
| 2018/0234807 | A1* | 8/2018 | Park | H04W 72/51 |
| 2019/0132104 | A1* | 5/2019 | Lee | H04W 4/40 |
| 2022/0116972 | A1* | 4/2022 | Liu | H04L 1/08 |
| 2022/0131655 | A1* | 4/2022 | Rico Alvarino | H04L 1/1861 |
| 2023/0097512 | A1* | 3/2023 | Yao | H04L 5/0053 |
| | | | | 370/329 |

FOREIGN PATENT DOCUMENTS

| | | |
|---|---|---|
| EP | 4383612 A1 | 6/2024 |
| EP | 4412354 A1 | 8/2024 |
| WO | 2019/225952 A1 | 11/2019 |

OTHER PUBLICATIONS

CATT; Discussion on reliability improvement mechanism for RRC_ CONNECTED UEs in MBS; 3GPP TSG RAN WG1 #107-e; R1-2111231; e-Meeting, Nov. 11-19, 2021; Nov. 6, 2021.

(Continued)

*Primary Examiner* — Ricardo H Castaneyra
(74) *Attorney, Agent, or Firm* — Jefferson IP Law, LLP

(57) ABSTRACT

The disclosure relates to a fifth generation (5G) or sixth generation (6G) communication system for supporting a higher data transmission rate. The method includes transmitting, to a base station, user equipment (UE) capability information indicating that the UE supports a frequency division multiplexing (FDM) between a unicast physical downlink shared channel (PDSCH) and a group-common PDSCH in a slot and receiving, from the base station, a first PDSCH that is the unicast PDSCH and a second PDSCH that is the group-common PDSCH, which are FDMed in the slot based on the UE capability information.

16 Claims, 15 Drawing Sheets

(56) References Cited

OTHER PUBLICATIONS

VIVO; Discussion on UE features for MBS; 3GPP TSG RAN WG1 #106bis; R1-2109022; e-Meeting, Oct. 11-19, 2021; Oct. 1, 2021.

CATT; Discussion on basic functions for broadcast/multicast for RRC_IDLE/RRC_INACTIVE UEs; 3GPP TSG RAN WG1 Meeting #107-e; R1-2111232; e-Meeting, Nov. 11-19, 2021; Nov. 6, 2021.

NTT Docomo, Inc .; Summary on UE features for NR MBS; 3GPP TSG RAN WG1 #107-e; R1-2112145; e-Meeting, Nov. 11-19, 2021; Nov. 20, 2021.

International Search Report with Written Opinion dated Mar. 31, 2023; International Appln. No. PCT/KR2022/021741.

Extended European Search Report dated Feb. 12, 2025, issued in a European Application No. 22916847.1.

CMCC; Discussion on reliability improvement; 3GPP TSG RAN WG1 #106-e; R1-2107426, Aug. 8, 2021.

Ericsson; Other aspects in MBS; 3GPP TSG-RAN2 Meeting #116-e; R2-2110412, Oct. 26, 2021.

Vivo; Discussion on UE features for MBS; 3GPP TSG RAN WG1 #106bis; R1-2109022, Oct. 2, 2021.

* cited by examiner

| row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2.3 | Type B | 0 | 5 | 7 |
| 9 | 2.3 | Type B | 0 | 5 | 2 |
| 10 | 2.3 | Type B | 0 | 9 | 2 |
| 11 | 2.3 | Type B | 0 | 12 | 2 |
| 12 | 2.3 | Type A | 0 | 1 | 1.3 |
| 13 | 2.3 | Type A | 0 | 1 | 6 |
| 14 | 2.3 | Type A | 0 | 2 | 4 |
| 15 | 2.3 | Type B | 0 | 4 | 7 |
| 16 | 2.3 | Type B | 0 | 8 | 4 |

FIG.7A

| row index | $\{K_0, S, L\}$ set |
|-----------|---------------------|
| 1 | $\{0, 0, 7\}, \{1, 2, 7\}, \{2, 4, 4\}$ |
| 2 | $\{1, 3, 4\}, \{3, 5, 7\}$ |
| 3 | $\{0, 0, 7\}, \{3, 7, 7\}$ |

FIG.7B

METHOD AND APPARATUS FOR RECEIVING AND TRANSMITTING DATA AND CONTROL INFORMATION

CROSS-REFERENCE TO RELATED APPLICATION(S)

This application is based on and claims priority under 35 U.S.C. § 119(a) of a Chinese patent application number 202111659947.X, filed on Dec. 31, 2021, in the Chinese Patent Office, the disclosure of which is incorporated by reference herein in its entirety.

BACKGROUND

1. Field

The disclosure generally relates to the field of wireless communication. More particularly, the disclosure relates to a terminal and a communication method thereof in a wireless communication system.

2. Description of Related Art

Fifth generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement sixth generation (6G) mobile communication technologies (referred to as Beyond 5G systems) in terahertz (THz) bands (for example, 95 GHz to 3THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, New Radio (NR) User Equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a terminal and a communication method thereof in a wireless communication system.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving at least one physical downlink shared channels (PDSCH) from one or more scheduled PDSCHs, wherein each of the one or more PDSCHs includes a unicast PDSCH including a dynamically scheduled unicast PDSCH and/or a unicast semi-persistent scheduling (SPS) PDSCH, and/or a multicast PDSCH including a dynamically scheduled multicast PDSCH and/or a multicast SPS PDSCH.

In accordance with another aspect of the disclosure, a terminal in a wireless communication system is provided. The terminal includes a transceiver configured to transmit and receive signals; and a controller coupled to the transceiver and configured to perform the operations in the above-mentioned method performed by the terminal.

In accordance with another aspect of the disclosure, a method performed by a base station in a wireless communication system is provided. The method includes transmitting one or more scheduled physical downlink shared channels (PDSCHs), wherein each of the one or more PDSCHs includes a unicast PDSCH including a dynamically scheduled unicast PDSCH and/or a unicast semi-persistent scheduling (SPS) PDSCH, and/or a multicast PDSCH including a dynamically scheduled multicast PDSCH and/or a multicast SPS PDSCH.

In accordance with another aspect of the disclosure, a base station in a wireless communication system is provided. The base station includes a transceiver configured to transmit and receive signals; and a controller coupled to the transceiver and configured to perform the operations in the above-mentioned method performed by the base station.

In accordance with another aspect of the disclosure, a non-transitory computer-readable storage medium is provided having one or more computer programs stored thereon, wherein the one or more computer programs, when executed by one or more processors, can implement any of the methods described above.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7A illustrates examples of time domain resource allocation tables (TDRAs) according to an embodiment of the disclosure;

FIG. 7B illustrates examples of TDRAs according to an embodiment of the disclosure;

Throughout the drawings, it should be noted that like reference numbers are used to depict the same or similar elements, features, and structures.

DETAILED DESCRIPTION

Figure 1:
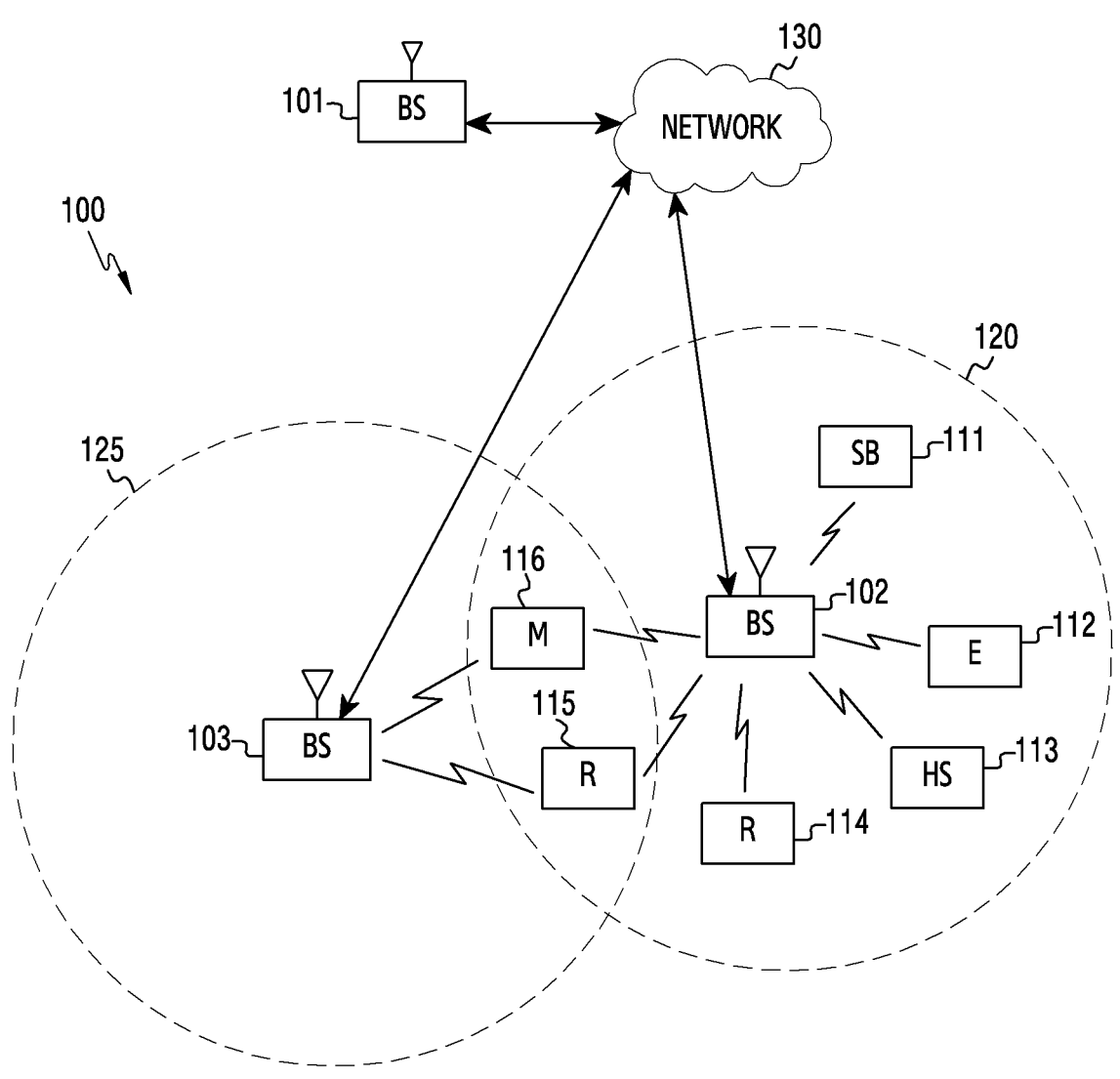
FIG. 1 illustrates a schematic diagram of an example wireless network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to their bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, connect to, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C. For example, "at least one of: A, B, or C" includes any of the following combinations: A, B, C, A and B, A and C, B and C, and A, B and C.

Moreover, various functions described below can be implemented or supported by one or more computer programs, each of which is formed from computer-readable program code and embodied in a computer-readable medium. The terms "application" and "program" refer to one or more computer programs, software components, sets of instructions, procedures, functions, objects, classes, instances, related data, or a portion thereof adapted for implementation in a suitable computer-readable program code. The phrase "computer-readable program code" includes any type of computer code, including source code, object code, and executable code. The phrase "computer-readable medium" includes any type of medium capable of being accessed by a computer, such as Read-Only Memory (ROM), Random Access Memory (RAM), a hard disk drive, a Compact Disc (CD), a Digital Video Disc (DVD), or any other type of memory. A "non-transitory" computer-readable medium excludes wired, wireless, optical, or other communication links that transport transitory electrical or other signals. A non-transitory computer-readable medium includes media where data can be permanently stored and media where data can be stored and later overwritten, such as a rewritable optical disc or an erasable memory device.

Terms used herein to describe the embodiments of the disclosure are not intended to limit and/or define the scope of the disclosure. For example, unless otherwise defined, the technical terms or scientific terms used in the disclosure shall have the ordinary meaning understood by those with ordinary skills in the art to which the disclosure belongs.

It should be understood that "first", "second" and similar words used in the disclosure do not express any order, quantity or importance, but are only used to distinguish different components.

As used herein, any reference to "an example" or "example", "an implementation" or "implementation", "an embodiment" or "embodiment" means that particular elements, features, structures or characteristics described in connection with the embodiment is included in at least one embodiment. The phrases "in one embodiment" or "in one example" appearing in different places in the specification do not necessarily refer to the same embodiment.

As used herein, "a portion of" something means "at least some of" the thing, and as such may mean less than all of, or all of, the thing As such, "a portion of" a thing includes the entire thing as a special case, i.e., the entire thing is an example of a portion of the thing.

As used herein, the term "set" means one or more. Accordingly, a set of items can be a single item or a collection of two or more items.

In this disclosure, to determine whether a specific condition is satisfied or fulfilled, expressions, such as "greater than" or "less than" are used by way of example and expressions, such as "greater than or equal to" or "less than or equal to" are also applicable and not excluded. For example, a condition defined with "greater than or equal to" may be replaced by "greater than" (or vice-versa), a condition defined with "less than or equal to" may be replaced by "less than" (or vice-versa), etc.

It will be further understood that similar words such as the term "include" or "comprise" mean that elements or objects appearing before the word encompass the listed elements or objects appearing after the word and their equivalents, but other elements or objects are not excluded. Similar words such as "connect" or "connected" are not limited to physical or mechanical connection, but can include electrical connection, whether direct or indirect. "Upper", "lower", "left" and "right" are only used to express a relative positional relationship, and when an absolute position of the described object changes, the relative positional relationship may change accordingly.

Those skilled in the art will understand that the principles of the disclosure can be implemented in any suitably arranged wireless communication system. For example, although the following detailed description of the embodiments of the disclosure will be directed to LTE and/or 5G communication systems, those skilled in the art will understand that the main points of the disclosure can also be applied to other communication systems with similar technical backgrounds and channel formats with slight modifications without departing from the scope of the disclosure. The technical schemes of the embodiments of the application can be applied to various communication systems, and for example, the communication systems may include global systems for mobile communications (GSM), code division multiple access (CDMA) systems, wideband code division multiple access (WCDMA) systems, general packet radio service (GPRS) systems, long term evolution (LTE) systems, LTE frequency division duplex (FDD) systems, LTE time division duplex (TDD) systems, universal mobile telecommunications system (UMTS), worldwide interoperability for microwave access (WiMAX) communication systems, 5th generation (5G) systems or new radio (NR) systems, etc. In addition, the technical schemes of the embodiments of the application can be applied to future-oriented communication technologies. In addition, the technical schemes of the embodiments of the application can be applied to future-oriented communication technologies.

In order to meet the increasing demand for wireless data communication services since the deployment of 4G communication systems, efforts have been made to develop improved 5G or pre-5G communication systems. Therefore, 5G or pre-5G communication systems are also called "Beyond 4G networks" or "Post-LTE systems".

In order to achieve a higher data rate, 5G communication systems are implemented in higher frequency (millimeter, mmWave) bands, e.g., 60 GHz bands. In order to reduce propagation loss of radio waves and increase a transmission distance, technologies such as beamforming, massive multiple-input multiple-output (MIMO), full-dimensional MIMO (FD-MIMO), array antenna, analog beamforming and large-scale antenna are discussed in 5G communication systems.

In addition, in 5G communication systems, developments of system network improvement are underway based on advanced small cell, cloud radio access network (RAN), ultra-dense network, device-to-device (D2D) communication, wireless backhaul, mobile network, cooperative communication, coordinated multi-points (CoMP), reception-end interference cancellation, etc.

In 5G systems, hybrid frequency shift keying (FSK) and quadrature amplitude modulation (QAM) (FQAM) and sliding window superposition coding (SWSC) as advanced coding modulation (ACM), and filter bank multicarrier (FBMC), non-orthogonal multiple access (NOMA) and sparse code multiple access (SCMA) as advanced access technologies have been developed.

Hereinafter, the embodiments of the disclosure will be described in detail with reference to the accompanying drawings. It should be noted that the same reference numerals in different drawings will be used to refer to the same elements already described.

The following FIGS. 1, 2A, 2B, 3A, 3B, 4, 5, 6A, 6B, 6C, 7A, 7B, and 8 to 10 describe various embodiments implemented by using orthogonal frequency division multiplexing (OFDM) or orthogonal frequency division multiple access (OFDMA) communication technologies in wireless communication systems. The descriptions of FIGS. 1, 2A, 2B, 3A, 3B, 4, 5, 6A, 6B, 6C, 7A, 7B, and 8 to 10 do not mean physical or architectural implications for the manner in which different embodiments may be implemented. Different embodiments of the disclosure may be implemented in any suitably arranged communication systems.

FIG. 1 illustrates an example wireless network 100 according to an embodiment of the disclosure.

Referring to FIG. 1, the embodiment of the wireless network 100 shown in FIG. 1 is for illustration only. Other embodiments of the wireless network 100 can be used without departing from the scope of the disclosure.

The wireless network 100 includes a gNodeB (gNB) 101, a gNB 102, and a gNB 103. gNB 101 communicates with gNB 102 and gNB 103. gNB 101 also communicates with at least one Internet Protocol (IP) network 130, such as the Internet, a private IP network, or other data networks.

Depending on a type of the network, other well-known terms such as "base station (BS)" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other well-known terms such as "mobile station", "user station", "remote terminal", "wireless terminal" or "user apparatus" can be used instead of "user equipment" or "UE". For example, the terms "terminal", "user equipment" and "UE" may be used in this patent document to refer to remote wireless devices that wirelessly access the gNB, no matter whether the UE is a mobile device (such as a mobile phone or a smart phone) or a fixed device (such as a desktop computer or a vending machine).

gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless Personal Digital Assistant (PDA), etc. GNB 103 provides wireless broadband access to network 130 for a second plurality of UEs within a coverage area 125 of gNB 103. The second plurality of UEs include a UE 115 and a UE 116. In some embodiments, one or more of gNBs 101-103 can communicate with each other and with UEs 111-116 using 5G, Long Term Evolution (LTE), LTE Advanced (LTE-A), WiMAX or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
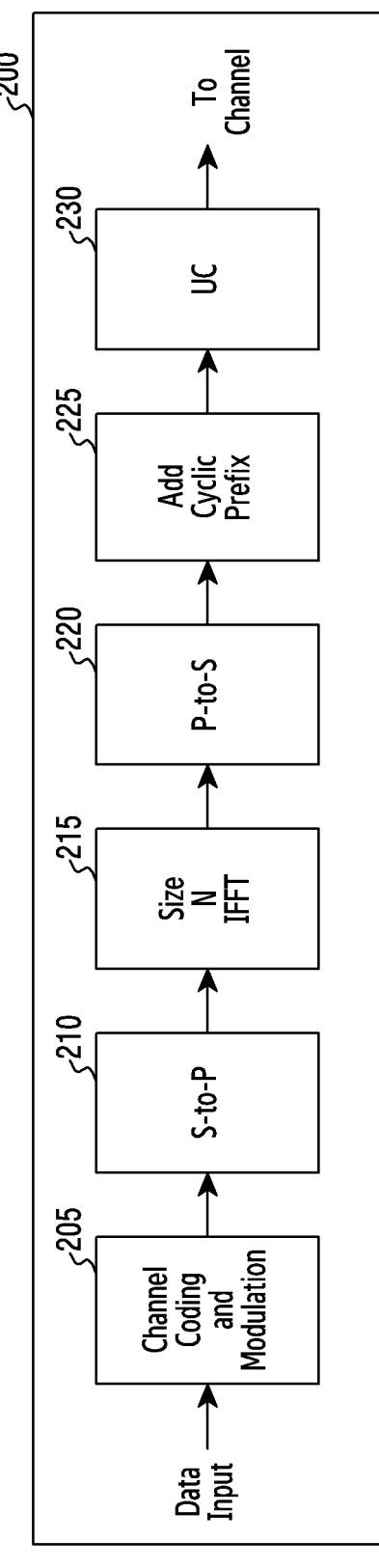
FIG. 2A illustrates example wireless transmission and reception paths according to an embodiment of the disclosure.
Figure 2B:
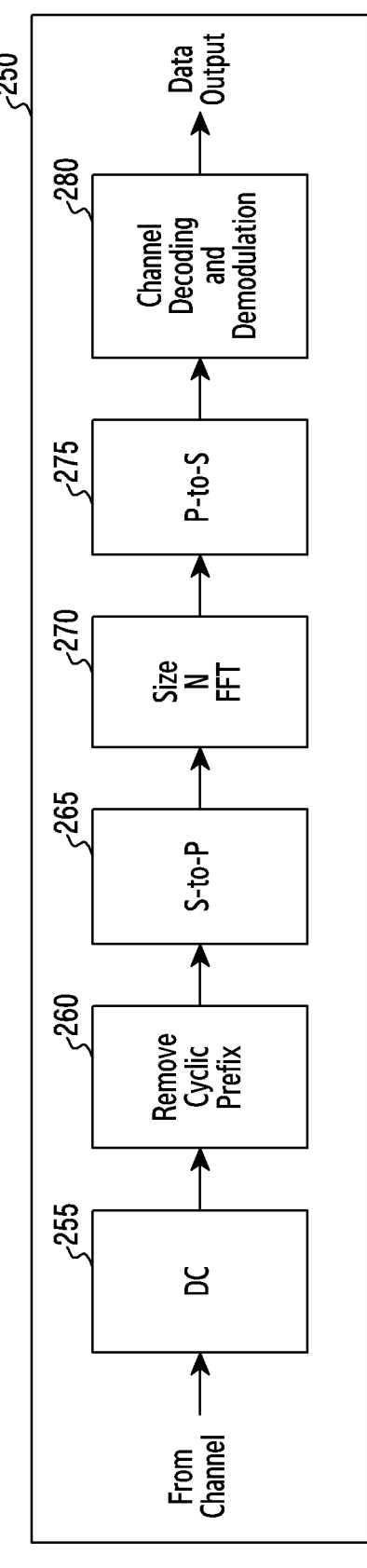
FIG. 2B illustrates example wireless transmission and reception paths according to an embodiment of the disclosure.

FIGS. 2A and 2B illustrate example wireless transmission and reception paths according to various embodiments of the disclosure.

Referring to FIGS. 2A and 2B, in the following description, the transmission path 200 can be described as being implemented in a gNB, such as gNB 102, and the reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC)

coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time domain output signal. The Parallel-to-Serial block 220 converts (such as multiplexes) parallel time domain output symbols from the Size N IFFT block 215 to generate a serial time domain signal. The cyclic prefix addition block 225 inserts a cyclic prefix into the time domain signal. The up-converter 230 modulates (such as up-converts) the output of the cyclic prefix addition block 225 a radio frequency (RF) for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time domain baseband signal. The Serial-to-Parallel block 265 converts the time domain baseband signal into a parallel time domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement a transmission path 200 similar to that for transmitting to UEs 111-116 in the downlink, and may implement a reception path 250 similar to that for receiving from UEs 111-116 in the uplink. Similarly, each of UEs 111-116 may implement a transmission path 200 for transmitting to gNBs 101-103 in the uplink, and may implement a reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
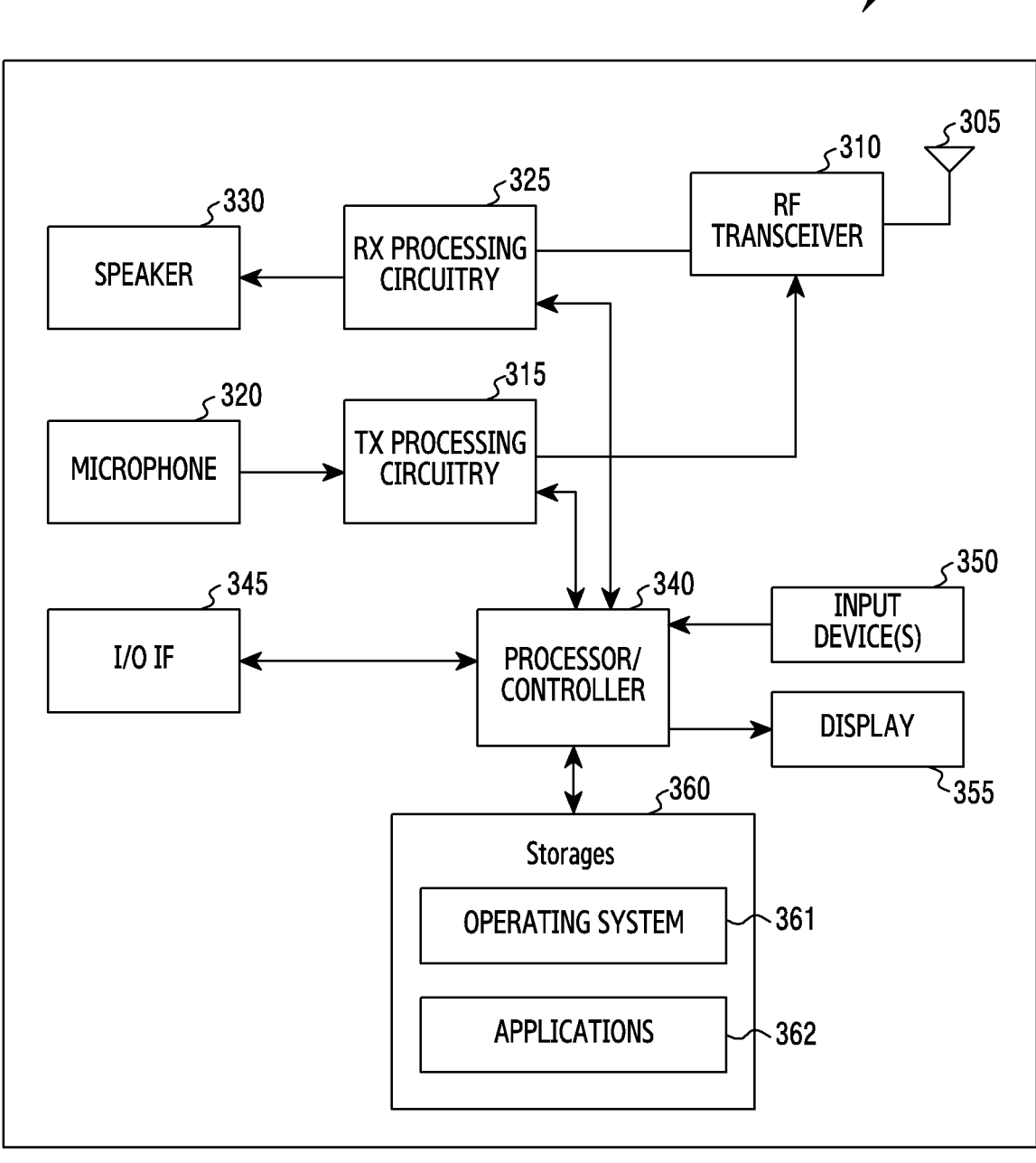
FIG. 3A illustrates an example user equipment (UE) according to an embodiment of the disclosure.

FIG. 3A illustrates an example UE 116 according to an embodiment of the disclosure.

Referring to FIG. 3A, the embodiment of UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE. For example, the UE 116 may include more or fewer components than those described above. In addition, the UE 116 corresponds to the UE of the FIG. 4.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute an OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315 according to well-known principles. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the application 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
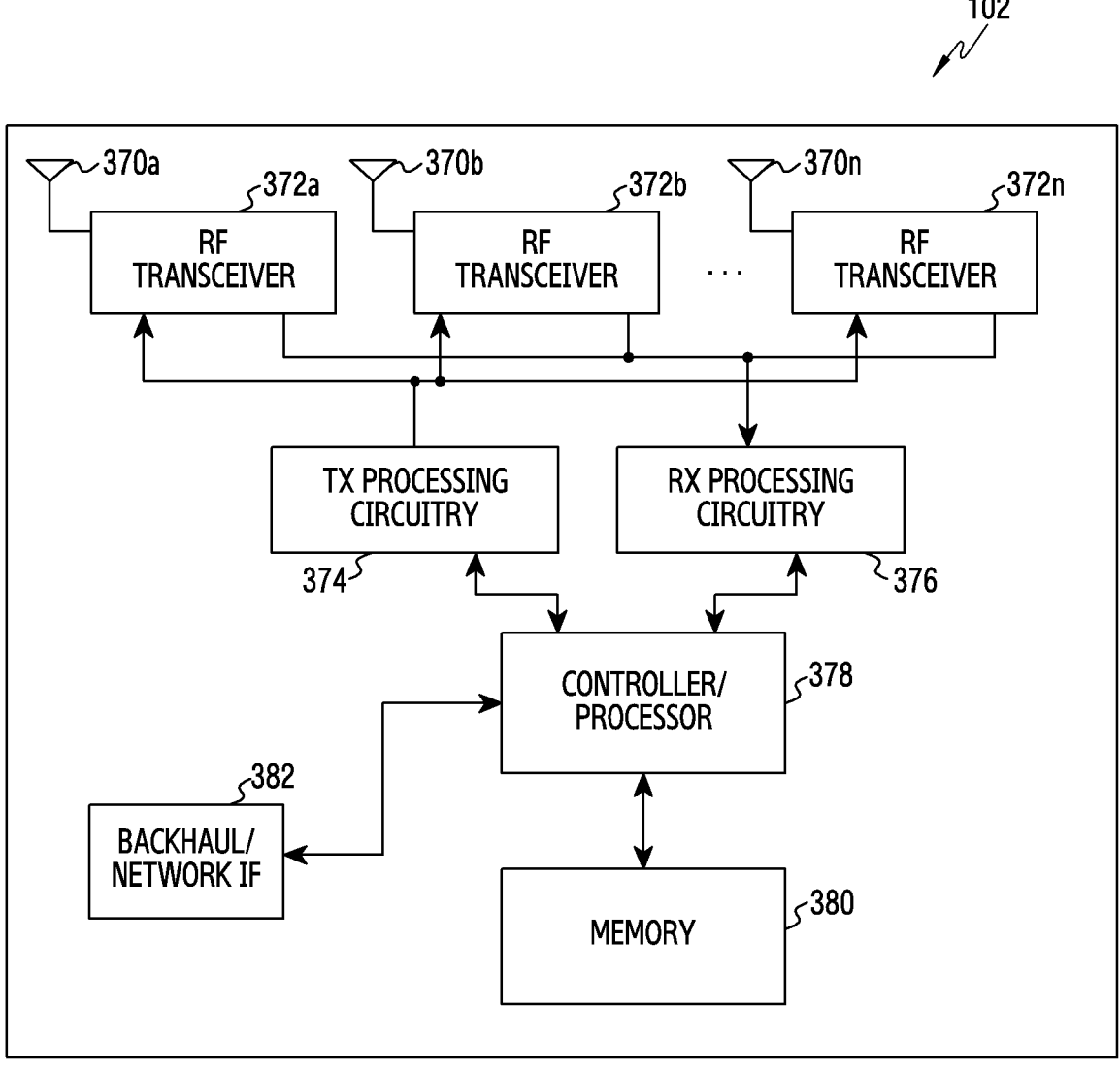
FIG. 3B illustrates an example gNodeB (gNB) according to an embodiment of the disclosure.

FIG. 3B illustrates an example gNB 102 according to an embodiment of the disclosure.

Referring to FIG. 3B, the embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102. However, the components of the base station are not limited thereto. For example, the base station may include more or fewer components than those described above. In addition, the base station corresponds to the base station of the FIG. 9.

As shown in FIG. 3B, gNB 102 includes a plurality of antennas 370a-370n, a plurality of RF transceivers 372a-372n, a transmission (TX) processing circuit 374, and a reception (RX) processing circuit 376. In certain embodiments, one or more of the plurality of antennas 370a-370n include a 2D antenna array. gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374 according to well-known principles. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. A controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web Real-Time Communications (RTCs). The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Those skilled in the art will understand that, "terminal" and "terminal device" as used herein include not only devices with wireless signal receiver which have no transmitting capability, but also devices with receiving and transmitting hardware which can carry out bidirectional communication on a bidirectional communication link. Such devices may include cellular or other communication devices with single-line displays or multi-line displays or cellular or other communication devices without multi-line displays; a PCS (personal communications service), which may combine voice, data processing, fax and/or data communication capabilities; a PDA (Personal Digital Assistant), which may include a radio frequency receiver, a pager, an internet/intranet access, a web browser, a notepad, a calendar and/or a GPS (Global Positioning System) receiver; a conventional laptop and/or palmtop computer or other devices having and/or including a radio frequency receiver. "Terminal" and "terminal device" as used herein may be portable, transportable, installed in vehicles (aviation, sea transportation and/or land), or suitable and/or configured to operate locally, and/or in distributed form, operate on the earth and/or any other position in space. "Terminal" and "terminal device" as used herein may also be a communication terminal, an internet terminal, a music/video playing terminal, such as a PDA, a MID (Mobile Internet Device) and/or a mobile phone with music/video playing functions, a smart TV, a set-top box and other devices.

With the rapid development of information industry, especially the increasing demand from mobile Internet and internet of things (IoT), it brings unprecedented challenges to the future mobile communication technology. According to the report of International Telecommunication Union (ITU) ITU-R M. [IMT.BEYOND 2020.TRAFFIC], it can be predicted that by 2020, compared with 2010 (4G era), the growth of mobile traffic will be nearly 1000 times, and the number of UE connections will also exceed 17 billion, and the number of connected devices will be even more alarming, with the massive IoT devices gradually infiltrating into the mobile communication network. In order to meet the unprecedented challenges, the communication industry and academia have carried out extensive research on the fifth generation (5G) mobile communication technology to face the 2020s. At present in ITU report ITU-R M. [IMT.VISION], the framework and overall goals of the future 5G has been discussed, in which the demand outlook, application scenarios and important performance indicators of 5G are described in detail. With respect to new requirements in 5G, ITU report ITU-R M[IMT.FUTURE TECHNOLOGY TRENDS] provides information related to the technology trends of 5G, aiming at solving significant problems such as significantly improved system throughput, consistent user experience, scalability to support IoT, delay, energy efficiency, cost, network flexibility, support of emerging services and flexible spectrum utilization. In 3GPP (3rd Generation Partnership Project), the first stage of 5G is already in progress. To support more flexible scheduling, the 3GPP decides to support variable Hybrid Automatic Repeat request-Acknowledgement (HARQ-ACK) feedback delay in 5G. In existing Long Term Evolution (LTE) systems, a time from reception of downlink data to uplink transmission of HARQ-ACK is fixed. For example, in Frequency Division Duplex (FDD) systems, the delay is 4 subframes. In Time Division Duplex (TDD) systems, a HARQ-ACK feedback delay is determined for a corresponding downlink subframe based on an uplink and downlink configuration. In 5G systems, whether FDD or TDD systems, for a determined downlink time unit (for example, a downlink slot or a downlink mini slot), the uplink time unit that can feedback HARQ-ACK is variable. For example, the delay of HARQ-ACK feedback can be dynamically indicated by physical layer signaling, or different HARQ-ACK delays can be determined based on factors such as different services or user capabilities.

The 3GPP has defined three directions of 5G application scenarios-enhanced mobile broadband (eMBB), massive machine-type communication (mMTC) and ultra-reliable and low-latency communication (URLLC). The eMBB scenario aims to further improve data transmission rate on the basis of the existing mobile broadband service scenario, so as to enhance user experience and pursue ultimate communication experience between people. mMTC and URLLC are, for example, the application scenarios of the Internet of Things, but their respective emphases are different: mMTC being mainly information interaction between people and things, while URLLC mainly reflecting communication requirements between things.

As described above, various services can be provided according to the development of the wireless communication systems, and thus a method for easily providing such services is required.

In order to solve at least the above technical problems, embodiments of the disclosure provide a method performed by a terminal, the terminal, a method performed by a base station and the base station in a wireless communication system, and a non-transitory computer-readable storage medium. Hereinafter, various embodiments of the disclosure will be described in detail with reference to the accompanying drawings.

In embodiments of the disclosure, for the convenience of description, a first transceiving node and a second transceiving node are defined. For example, the first transceiving node may be a base station, and the second transceiving node may be a UE. In the following examples, the base station is taken as an example (but not limited thereto) to illustrate the first transceiving node, and the UE is taken as an example (but not limited thereto) to illustrate the second transceiving node.

Exemplary embodiments of the disclosure are further described below with reference to the drawings.

The text and drawings are provided as examples only to help readers understand the disclosure. They are not intended and should not be interpreted as limiting the scope of the disclosure in any way. Although certain embodiments and examples have been provided, based on the content disclosed herein, it will be apparent to those skilled in the art that changes may be made to the illustrated embodiments and examples without departing from the scope of the disclosure.

Figure 4:
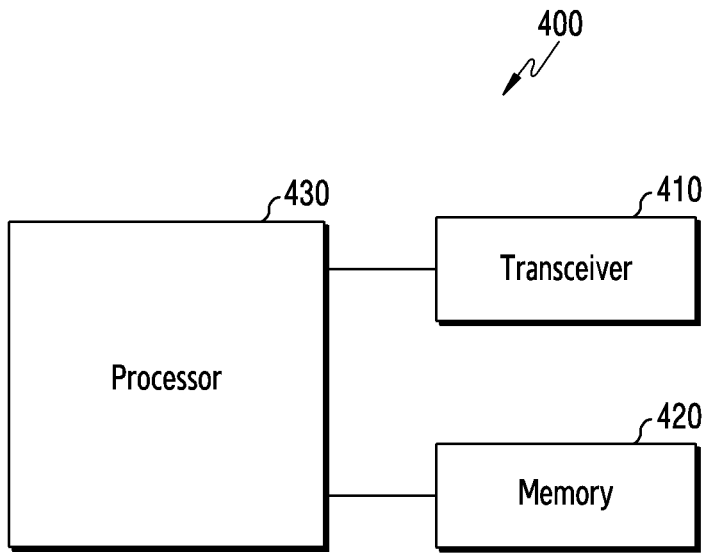
FIG. 4 illustrates a block diagram of a second transceiving node according to an embodiment of the disclosure.

FIG. 4 illustrates a block diagram of the second transceiving node according to an embodiment of the disclosure.

Referring to FIG. 4, the second transceiving node 400 may include a transceiver 410, a memory 420 and processor 430. The second transceiving node may be a terminal. The transceiver 410, the memory 420, and the processor 430 of the terminal may operate according to a communication method of the terminal described above. However, the components of the terminal are not limited thereto. For example, the terminal may include more or fewer components than those described above. In addition, the processor 430, the transceiver 410, and the memory 420 may be implemented as a single chip. Also, the processor 430 may include at least one processor. Furthermore, the UE of FIG. 4 corresponds to the UE 116 of the FIG. 3A.

The transceiver 410 collectively refers to a terminal receiver and a terminal transmitter, and may transmit/receive a signal to/from a base station. The signal transmitted or received to or from the base station may include control information and data. In this regard, the transceiver 410 may include a RF transmitter for up-converting and amplifying a frequency of a transmitted signal, and a RF receiver for amplifying low-noise and down-converting a frequency of a received signal. However, this is only an example of the transceiver 410 and components of the transceiver 410 are not limited to the RF transmitter and the RF receiver.

Also, the transceiver 410 may receive and output, to the processor 430, a signal through a wireless channel, and transmit a signal output from the processor 430 through the wireless channel.

The memory 420 may store a program and data required for operations of the terminal. Also, the memory 420 may store control information or data included in a signal obtained by the terminal. The memory 420 may be a storage medium, such as ROM, RAM, a hard disk, a CD-ROM, and a DVD, or a combination of storage media.

The processor 430 may control a series of processes such that the terminal operates as described above. For example, the transceiver 410 may receive a data signal including a control signal, and the processor 430 may determine a result of receiving the data signal.

The transceiver 410 may be configured to receive first data and/or first control signaling from the first transceiving node, and transmit second data and/or second control signaling to the first transceiving node in a determined time unit.

The processor 430 may be an application specific integrated circuit or at least one processor. The processor 430 may be configured to control the overall operation of the second transceiving node and control the second transceiving node to implement the methods proposed in the embodiments of the disclosure. For example, the processor 430 may be configured to determine the second data and/or the second control signaling and a time unit for transmitting the second data and/or the second control signaling based on the first data and/or the first control signaling, and control the transceiver 410 to transmit the second data and/or the second control signaling to the first transceiving node in the determined time unit.

In some implementations, the processor 430 may be configured to perform one or more operations in methods of various embodiments described below. For example, the processor 430 may be configured to perform one or more of operations in a method 500 to be described later in connection with FIG. 5 and/or a method 800 to be described in connection with FIG. 8.

In some implementations, the first data may be data transmitted by the first transceiving node to the second transceiving node. In the following examples, downlink data carried by a PDSCH (Physical Downlink Shared Channel) is taken as an example (but not limited thereto) to illustrate the first data.

In some implementations, the second data may be data transmitted by the second transceiving node to the first transceiving node. In the following examples, uplink data carried by a PUSCH (Physical Uplink Shared Channel) is taken as an example to illustrate the second data, but not limited thereto.

In some implementations, the first control signaling may be control signaling transmitted by the first transceiving node to the second transceiving node. In the following examples, downlink control signaling is taken as an example (but not limited thereto) to illustrate the first control signaling. The downlink control signaling may be DCI (downlink control information) carried by a PDCCH (Physical Downlink Control Channel) and/or control signaling carried by a PDSCH (Physical Downlink Shared Channel). For example, the DCI may be UE specific DCI, and the DCI may also be common DCI. The common DCI may be DCI common to a part of UEs, such as group common DCI, and the common DCI may also be DCI common to all of the UEs. The DCI may be uplink DCI (e.g., DCI for scheduling a PUSCH) and/or downlink DCI (e.g., DCI for scheduling a PDSCH).

In some implementations, the second control signaling may be control signaling transmitted by the second transceiving node to the first transceiving node. In the following examples, uplink control signaling is taken as an example (but is not limited thereto) to illustrate the second control signaling. The uplink control signaling may be UCI (Uplink Control Information) carried by a PUCCH (Physical Uplink Control Channel) and/or control signaling carried by a PUSCH (Physical Uplink Shared Channel). A type of UCI may include one or more of: HARQ-ACK information, SR (Scheduling Request), LRR (Link Recovery Request), CSI (Chanel State Information) or CG (Configured Grant) UCI. In embodiments of the disclosure, when UCI is carried by a PUCCH, the UCI may be used interchangeably with the PUCCH.

In some implementations, a PUCCH carrying SR may be a PUCCH carrying positive SR and/or negative SR. The SR may be the positive SR and/or the negative SR.

In some implementations, the CSI may also be Part 1 CSI and/or Part 2 CSI.

In some implementations, a first time unit is a time unit in which the first transceiving node transmits the first data and/or the first control signaling. In the following examples, a downlink time unit is taken as an example (but not limited thereto) to illustrate the first time unit.

In some implementations, a second time unit is a time unit in which the second transceiving node transmits the second data and/or the second control signaling. In the following examples, an uplink time unit is taken as an example (but not limited thereto) to illustrate the second time unit.

In some implementations, the first time unit and the second time unit may be one or more slots, one or more subslots, one or more OFDM symbols, or one or more subframes.

Herein, depending on the network type, the term "base station" or "BS" can refer to any component (or a set of components) configured to provide wireless access to a network, such as a Transmission Point (TP), a Transmission and Reception Point (TRP), an evolved base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio (NR) interface/access, Long Term Evolution (LTE), LTE advanced (LTE-A), High Speed Packet Access (HSPA), Wi-Fi 802.11a/b/g/n/ac, etc.

In describing a wireless communication system and in the disclosure described below, higher layer signaling or higher layer signals are signal transferring methods for transferring information from a base station to a terminal over a downlink data channel of a physical layer or from a terminal to a base station over an uplink data channel of a physical layer, and examples of the signal transferring methods may include signal transferring methods for transferring information via Radio Resource Control (RRC) signaling, Packet Data Convergence Protocol (PDCP) signaling, or a Medium Access Control (MAC) Control Element (MAC CE).

Figure 5:
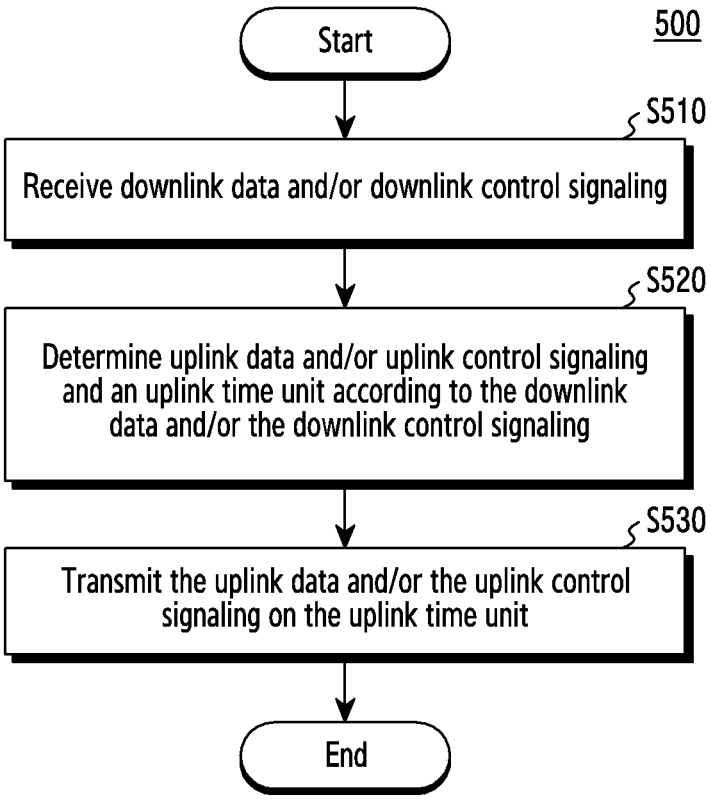
FIG. 5 illustrates a flowchart of a method performed by a UE according to an embodiment of the disclosure.

FIG. 5 illustrates a flowchart of a method performed by a UE according to embodiments of the disclosure.

Referring to FIG. 5, operation 5510, the UE may receive downlink data (e.g., downlink data carried by a PDSCH) and/or downlink control signaling from a base station. For example, the UE may receive the downlink data and/or the downlink control signaling from the base station based on predefined rules and/or received configuration parameters.

Operation 5520, the UE determines uplink data and/or uplink control signaling and an uplink time unit based on the downlink data and/or downlink control signaling.

Operation 5530, the UE transmits the uplink data and/or the uplink control signaling to the base station in an uplink time unit.

In some implementations, acknowledgement/negative acknowledgement (ACK/NACK) for downlink transmissions may be performed through HARQ-ACK.

In some implementations, the downlink control signaling may include DCI carried by a PDCCH and/or control signaling carried by a PDSCH. For example, the DCI may be used to schedule transmission of a PUSCH or reception of a PDSCH. Some examples of uplink transmission timing will be described below with reference to FIGS. 6A to 6C.

Figure 6A:
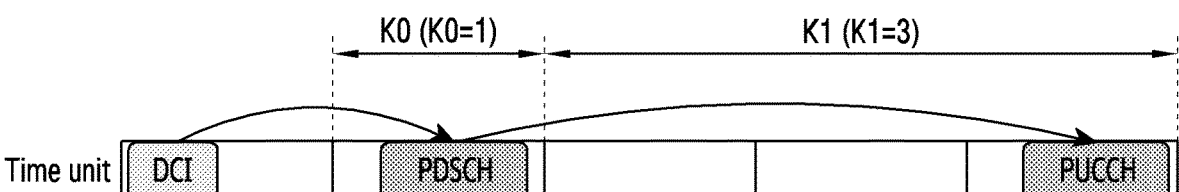
FIG. 6A illustrates some examples of uplink transmission timing according to an embodiment of the disclosure.
Figure 6B:
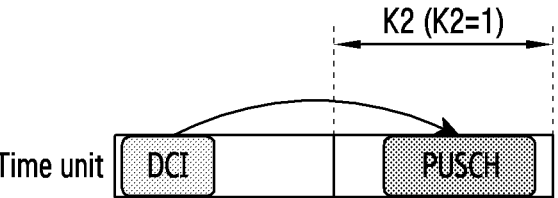
FIG. 6B illustrates some examples of uplink transmission timing according to an embodiment of the disclosure.
Figure 6C:
FIG. 6C illustrates some examples of uplink transmission timing according to an embodiment of the disclosure.

FIGS. 6A, 6B, and 6C illustrate some examples of uplink transmission timing according to various embodiments of the disclosure. In an example, the UE receives the DCI and receives the PDSCH based on time domain resources indicated by the DCI. For example, a parameter K0 may be used to represent a time interval between the PDSCH scheduled by the DCI and the PDCCH carrying the DCI, and K0 may be in units of slots. For example, FIG. 6A gives an example in which K0=1. In the example illustrated in FIG. 6A, the time interval from the PDSCH scheduled by the DCI to the PDCCH carrying the DCI is one slot. In embodiments of the disclosure, "a UE receives DCI" may be understood as "the UE detects the DCI".

In another example, the UE receives the DCI and transmits the PUSCH based on time domain resources indicated by the DCI. For example, a timing parameter K2 may be used to represent a time interval between the PUSCH scheduled by the DCI and the PDCCH carrying the DCI, and K2 may be in units of slots. For example, FIG. 6B gives an example in which K2=1. In the example illustrated in FIG. 6B, the time interval between the PUSCH scheduled by the DCI and the PDCCH carrying the DCI is one slot. K2 may also represent a time interval between a PDCCH for activating a CG (configured grant) PUSCH and the first activated CG PUSCH. In examples of the disclosure, unless otherwise specified, the PUSCH may be a PUSCH scheduled by DCI (e.g., DG (dynamic grant) PUSCH) and/or a PUSCH not scheduled by DCI (e.g., CG PUSCH).

In yet another example, the UE receives the PDSCH, and may transmit HARQ-ACK information for the PDSCH in a PUCCH in the uplink time unit. For example, a timing parameter (which may also be referred to as a timing value) K1 (e.g., the parameter dl-DataToUL-ACK in 3GPP) may be used to represent a time interval between the PUCCH for transmitting the HARQ-ACK information for the PDSCH and the PDSCH, and K1 may be in units of uplink time units, such as slots or subslots. In a case where K1 is in units of slots, the time interval is a value of a slot offset between the PUCCH for feeding back the HARQ-ACK information for the PDSCH and the PDSCH, and K1 may be referred to as a slot timing value. For example, FIG. 6A gives an example in which K1=3. In the example illustrated in FIG. 6A, the time interval between the PUCCH for transmitting the HARQ-ACK information for the PDSCH and the PDSCH is 3 slots. It should be noted that in embodiments of the disclosure, the timing parameter K1 may be used interchangeably with a timing parameter K1, the timing parameter K0 may be used interchangeably with a timing parameter K0, and the timing parameter K2 may be used interchangeably with a timing parameter K2.

In examples of the disclosure, the PDSCH may be a PDSCH scheduled by the DCI and/or a SPS PDSCH. The UE will periodically receive the SPS PDSCH after the SPS PDSCH is activated by the DCI. In examples of the disclosure, the SPS PDSCH may be equivalent to a PDSCH not scheduled by the DCI/PDCCH, or a PDSCH without an associated PDCCH transmission. After the SPS PDSCH is released (deactivated), the UE will no longer receive the SPS PDSCH.

In embodiments of the disclosure, HARQ-ACK may be HARQ-ACK for a SPS PDSCH reception (for example, HARQ-ACK not indicated by DCI) and/or HARQ-ACK indicated by a DCI format (for example, HARQ-ACK for a PDSCH scheduled by a DCI format).

In yet another example, the UE receives the DCI (e.g., DCI indicating SPS (Semi-Persistent Scheduling) PDSCH release (deactivation)), and may transmit HARQ-ACK information for the DCI in the PUCCH in the uplink time unit. For example, the timing parameter K1 may be used to represent a time interval between the PUCCH for transmitting the HARQ-ACK information for the DCI and the DCI, and K1 may be in units of uplink time units, such as slots or subslots. For example, FIG. 6C gives an example in which K1=3. In the example of FIG. 6C, the time interval between the PUCCH for transmitting the HARQ-ACK information for the DCI and the DCI is 3 slots. For example, the timing parameter K1 may be used to represent a time interval between a PDCCH reception carrying DCI indicating SPS PDSCH release (deactivation) and the PUCCH feeding back HARQ-ACK for the PDCCH reception.

In some implementations, operation 5520, the UE may report (or signal/transmit) a UE capability to the base station or indicate the UE capability. For example, the UE reports (or signals/transmits) the UE capability to the base station by transmitting the PUSCH. In this case, the UE capability information is included in the PUSCH transmitted by the UE.

In some implementations, the base station may configure higher layer signaling for the UE based on a UE capability previously received from the UE (for example, operation 5510 in the previous downlink-uplink transmission processes). For example, the base station configures the higher layer signaling for the UE by transmitting the PDSCH. In this case, the higher layer signaling configured for the UE is included in the PDSCH transmitted by the base station. It should be noted that the higher layer signaling is higher layer signaling compared with physical layer signaling, and the higher layer signaling may include RRC signaling and/or a MAC CE.

In some implementations, downlink channels (downlink resources) may include PDCCHs and/or PDSCHs. Uplink channels (uplink resources) may include PUCCHs and/or PUSCHs.

In some implementations, the UE may be configured with two levels of priorities for uplink transmission. For example, the two levels of priorities may include a first priority and a second priority which are different from each other. In an example, the first priority may be higher than the second priority. In another example, the first priority may be lower than the second priority. However, embodiments of the disclosure are not limited to this, and for example, the UE may be configured with more than two levels of priorities. For the sake of convenience, in embodiments of the disclosure, description will be made considering that the first priority is higher than the second priority. It should be noted that all embodiments of the disclosure are applicable to situations where the first priority may be higher than the second priority; all embodiments of the disclosure are applicable to situations where the first priority may be lower than the second priority; and all embodiments of the disclosure are applicable to situations where the first priority may be equal to the second priority.

In some implementations, the UE may be configured with a subslot-based PUCCH transmission. For example, a subslot length parameter (which may also be referred to as a parameter with respect to a subslot length in embodiments of the disclosure) (e.g., the parameter subslotLengthFor-PUCCH in 3GPP) of each PUCCH configuration parameter of the first PUCCH configuration parameter and the second PUCCH configuration parameter may be 7 OFDM symbols or 6 OFDM symbols or 2 OFDM symbols. Subslot configuration length parameters in different PUCCH configuration parameters may be configured separately. If no subslot length parameter is configured in a PUCCH configuration parameter, the scheduling time unit of this PUCCH configuration parameter is one slot by default. If a subslot length parameter is configured in the PUCCH configuration parameter, the scheduling time unit of this PUCCH configuration parameter is L (L is the configured subslot configuration length) OFDM symbols.

The mechanism of slot-based PUCCH transmissions is basically the same as that of subslot-based PUCCH transmissions. In the disclosure, a slot may be used to represent a PUCCH occasion unit; for example, if the UE is configured with subslots, a slot which is a PUCCH occasion unit may be replaced with a subslot. For example, it may be specified by protocols that if the UE is configured with the subslot length parameter (e.g., the parameter subslotLength-ForPUCCH in 3GPP), unless otherwise indicated, a number of symbols contained in the slot of the PUCCH transmission is indicated by the subslot length parameter.

For example, if the UE is configured with the subslot length parameter, and subslot n is the last uplink subslot overlapping with a PDSCH reception or PDCCH reception (e.g., indicating SPS PDSCH release, and/or indicating secondary cell dormancy, and/or triggering a Type-3 HARQ-ACK codebook report and without scheduling a PDSCH reception), then HARQ-ACK information for the PDSCH reception or PDCCH reception is transmitted in an uplink subslot n+k, where k is determined by the timing parameter K1 (the definition of the timing parameter K1 may refer to the previous description). For another example, if the UE is not configured with the subslot length parameter, and slot n is the last uplink slot overlapping with a downlink slot where the PDSCH reception or PDCCH reception is located, then the HARQ-ACK information for the PDSCH reception or PDCCH reception is transmitted in an uplink slot n+k, where K is determined by the timing parameter K1.

In embodiments of the disclosure, unicast may refer to a manner in which a network communicates with a UE, and multicast may refer to a manner in which a network communicates with multiple UEs. For example, a unicast PDSCH may be a PDSCH received by a UE, and the scrambling of the PDSCH may be based on a Radio Network Temporary Identifier (RNTI) specific to the UE, e.g., Cell-RNTI (C-RNTI). A multicast PDSCH may be a PDSCH received by more than one UE simultaneously, and the scrambling of the multicast PDSCH may be based on a UE-group common RNTI. For example, the UE-group common RNTI for scrambling the multicast PDSCH may include an RNTI (referred to as G-RNTI in embodiments of the disclosure) for scrambling of a dynamically scheduled multicast transmission (e.g., PDSCH) or an RNTI (referred to as G-CS-RNTI in embodiments of the disclosure) for scrambling of a multicast SPS transmission (e.g., SPS PDSCH). The G-CS-RNTI and the G-RNTI may be different RNTIs or same RNTI. UCI(s) of the unicast PDSCH may include HARQ-ACK information, SR, or CSI of the unicast PDSCH. UCI(s) of the multicast PDSCH may include HARQ-ACK information for the multicast PDSCH. In embodiments of the disclosure, "multicast" may also be replaced by "broadcast".

In some implementations, a HARQ-ACK codebook may include HARQ-ACK information for one or more PDSCHs and/or DCI. If the HARQ-ACK information for the one or more PDSCHs and/or DCI is transmitted in a same uplink time unit, the UE may generate the HARQ-ACK codebook based on a predefined rule. For example, if a PDSCH is successfully decoded, the HARQ-ACK information for this PDSCH is positive ACK. The positive ACK may be represented by 1 in the HARQ-ACK codebook, for example. If a PDSCH is not successfully decoded, the HARQ-ACK information for this PDSCH is Negative ACK (NACK). NACK may be represented by 0 in the HARQ-ACK codebook, for example. For example, the UE may generate the HARQ-ACK codebook based on the pseudo code specified by protocols. In an example, if the UE receives a DCI format that indicates SPS PDSCH release (deactivation), the UE transmits HARQ-ACK information (ACK) for the DCI format. In another example, if the UE receives a DCI format that indicates secondary cell dormancy, the UE transmits the HARQ-ACK information (ACK) for the DCI format. In yet another example, if the UE receives a DCI format that indicates to transmit HARQ-ACK information (e.g., a Type-3 HARQ-ACK codebook in 3GPP) of all HARQ-ACK processes of all configured serving cells, the UE transmits the HARQ-ACK information of all HARQ-ACK processes of all configured serving cells. In order to reduce a size of the Type-3 HARQ-ACK codebook, in an enhanced Type-3 HARQ-ACK codebook, the UE may transmit HARQ-ACK information of a specific HARQ-ACK process of a specific serving cell based on an indication of the DCI. In yet another example, if the UE receives a DCI format that schedules a PDSCH, the UE transmits HARQ-ACK information for the PDSCH. In yet another example, the UE receives a SPS PDSCH, and the UE transmits HARQ-ACK information for the SPS PDSCH reception. In yet another example, if the UE is configured by higher layer signaling to receive a SPS PDSCH, the UE transmits HARQ-ACK information for the SPS PDSCH reception. The reception of the SPS PDSCH configured by higher layer signaling may be cancelled by other signaling. In yet another example, if at least one uplink symbol (e.g., OFDM symbol) of the UE in a semi-static frame structure configured by higher layer signaling overlaps with a symbol of the SPS PDSCH reception, the UE does not receive the SPS PDSCH. In yet another example, if the UE is configured by higher layer signaling to receive a SPS PDSCH according to a predefined rule, the UE transmits HARQ-ACK information for the SPS PDSCH reception. It should be noted that in embodiments of the disclosure, "'A' overlaps with 'B'" may mean that 'A' at least partially overlaps with 'B'. That is, "'A' overlaps with 'B'" includes a case where 'A' completely overlaps with 'B'.

In some implementations, if HARQ-ACK information transmitted in a same uplink time unit does not include HARQ-ACK information for any DCI format, nor does it include HARQ-ACK information for a dynamically scheduled PDSCH (e.g., a PDSCH scheduled by a DCI format) and/or DCI, or the HARQ-ACK information transmitted in the same uplink time unit only includes HARQ-ACK information for one or more SPS PDSCH receptions, the UE may generate HARQ-ACK information according to a rule for generating a SPS PDSCH HARQ-ACK codebook.

In some implementations, if HARQ-ACK information transmitted in a same uplink time unit includes HARQ-ACK information for a DCI format, and/or a dynamically scheduled PDSCH (e.g., a PDSCH scheduled by a DCI format), the UE may generate HARQ-ACK information according to a rule for generating a HARQ-ACK codebook for a dynamically scheduled PDSCH and/or a DCI format. For example, the UE may determine to generate a semi-static HARQ-ACK codebook (e.g., Type-1 HARQ-ACK codebook in 3GPP) or a dynamic HARQ-ACK codebook (e.g., Type-2 HARQ-ACK codebook in 3GPP) according to a PDSCH HARQ-ACK codebook configuration parameter (e.g., the parameter pdsch-HARQ-ACK-Codebook in 3GPP). The dynamic HARQ-ACK codebook may also be an enhanced dynamic HARQ-ACK codebook (e.g., Type-2 HARQ-ACK codebook based on grouping and HARQ-ACK retransmission in 3GPP).

In some implementations, if HARQ-ACK information transmitted in a same uplink time unit includes only HARQ-ACK information for a SPS PDSCH (e.g., a PDSCH not scheduled by a DCI format), the UE may generate the HARQ-ACK codebook according to a rule for generating a HARQ-ACK codebook for a SPS PDSCH reception (e.g., the pseudo code for generating a HARQ-ACK codebook for a SPS PDSCH reception defined in 3GPP).

The semi-static HARQ-ACK codebook (e.g., 3GPP TS 38.213 Type-1 HARQ-ACK codebook) may determine the size of the HARQ-ACK codebook and an order of HARQ-ACK bits according to a semi-statically parameter (e.g., a parameter configured by higher layer signaling). For a serving cell c, an active downlink BWP (bandwidth part) and an active uplink BWP, the UE determines a set of $M_{A,C}$ occasions for candidate PDSCH receptions for which the UE can transmit corresponding HARQ-ACK information in a PUCCH in an uplink slot $n_u$.

$M_{A,C}$ may be determined by at least one of:

a) HARQ-ACK slot timing values K1 of the active uplink BWP;

b) a downlink time domain resource allocation (TDRA) table;

c) an uplink sub-carrier spacing (SCS) configuration and a downlink SCS configuration;

d) a semi-static uplink and downlink frame structure configuration;

e) a downlink slot offset parameter (e.g., 3GPP parameter $N_{slot,offset,c}^{DL}$) for the serving cell c and its corresponding SCS parameter (e.g., 3GPP parameter $\mu_{offset,DL,c}$), and a slot offset parameter (e.g., 3GPP parameter $N_{slot,offset}^{UL}$) for a primary serving cell and its corresponding SCS parameter (e.g., 3GPP parameter $\mu_{offset,UL}$).

The parameter K1 is used to determine a candidate uplink slot, and then determine candidate downlink slots according to the candidate uplink slot. The candidate downlink slots satisfy at least one of the following conditions: (i) if the time unit of the PUCCH is a subslot, the end of at least one candidate PDSCH reception in the candidate downlink slots overlaps with the candidate uplink slot in time domain; or (ii) if the time unit of the PUCCH is a slot, the end of the candidate downlink slots overlap with the candidate uplink slot in time domain. It should be noted that, in embodiments of the disclosure, a starting symbol may be used interchangeably with a start position, and an end symbol may be used interchangeably with an end position. In some implementations, the starting symbol may be replaced by the end symbol, and/or the end symbol may be replaced by the starting symbol.

A number of PDSCHs in a candidate downlink slot for which HARQ-ACK needs to be fed back may be determined by a maximum value of a number of non-overlapping valid PDSCHs in the downlink slot (for example, the valid PDSCHs may be PDSCHs that do not overlap with semi-statically configured uplink symbols). Time domain resources occupied by the PDSCHs may be determined by (i) a time domain resource allocation table configured by higher layer signaling (in embodiments of the disclosure, it may also be referred to as a table associated with time domain resource allocation) and (ii) a certain row in the time domain resource allocation table dynamically indicated by DCI. Each row in the time domain resource allocation table may define information with respect to time domain resource allocation. For example, for the time domain resource allocation table, an indexed row defines a timing value (e.g., time unit (e.g., slot) offset (e.g., K0)) between a PDCCH and a PDSCH, and a start and length indicator (SLIV), or directly defines a starting symbol and allocation length. For example, for the first row of the time domain resource allocation table, a start OFDM symbol is 0 and an OFDM symbol length is 4; for the second row of the time domain resource allocation table, the start OFDM symbol is 4 and the OFDM symbol length is 4; and for the third row of the time domain resource allocation table, the start OFDM symbol is 7 and the OFDM symbol length is 4. The DCI for scheduling the PDSCH may indicate any row in the time domain resource allocation table. When all OFDM symbols in the downlink slot are downlink symbols, the maximum value of the number of non-overlapping valid PDSCHs in the downlink slot is 2. At this time, the Type-1 HARQ-ACK codebook may need to feed back HARQ-ACK information for two PDSCHs in the downlink slot on the serving cell.

FIGS. 7A and 7B illustrate examples of a time domain resource allocation table according to various embodiments of the disclosure.

Specifically, FIG. 7A illustrates a time domain resource allocation table in which one PDSCH is scheduled by one row, and FIG. 7B illustrates a time domain resource allocation table in which multiple PDSCHs are scheduled by one row. Referring to FIG. 7A, each row corresponds to a value of a timing parameter K0, a value of S indicating a starting symbol, and a value of L indicating a length, where an SLIV may be determined by the value of S and the value of L. Referring to FIG. 7B, unlike FIG. 7A, each row corresponds to values of multiple sets of {K0, S, L}.

In some implementations, the dynamic HARQ-ACK codebook and/or the enhanced dynamic HARQ-ACK codebook may determine a size and an order of the HARQ-ACK codebook according to an assignment indicator. For example, the assignment indicator may be a DAI (Downlink Assignment Indicator). In the following embodiments, the assignment indicator as the DAI is taken as an example for illustration. However, the embodiments of the disclosure are not limited thereto, and any other suitable assignment indicator may be adopted.

In some implementations, a DAI field includes at least one of a first DAI and a second DAI.

In some examples, the first DAI may be a C-DAI (Counter-DAI). The first DAI may indicate an accumulative number of at least one of DCI scheduling PDSCH(s), DCI indicating SPS PDSCH release (deactivation), or DCI indicating secondary cell dormancy. For example, the accumulative number may be an accumulative number up to the current serving cell and/or the current time unit. For example, C-DAI may refer to: an accumulative number of {serving cell, time unit} pair(s) scheduled by PDCCH(s) up to the current time unit within a time window (which may also include a number of PDCCHs (e.g., PDCCHs indicating SPS release and/or PDCCHs indicating secondary cell dormancy)); or an accumulative number of PDCCH(s) up to the current time unit; or an accumulative number of PDSCH transmission(s) up to the current time unit; or an accumulative number of {serving cell, time unit} pair(s) in which PDSCH transmission(s) related to PDCCH(s) (e.g., scheduled by the PDCCH(s)) and/or PDCCH(s) (e.g., PDCCH indicating SPS release and/or PDCCH indicating secondary cell dormancy) is present, up to the current serving cell and/or the current time unit; or an accumulative number of PDSCH(s) with corresponding PDCCH(s) and/or PDCCHs (e.g., PDCCHs indicating SPS release and/or PDCCHs indicating secondary cell dormancy) already scheduled by a base station up to the current serving cell and/or the current time unit; or an accumulative number of PDSCHs (the PDSCHs are PDSCHs with corresponding PDCCHs) already scheduled by the base station up to the current serving cell and/or the current time unit; or an accumulative number of time units with PDSCH transmissions (the PDSCHs are PDSCHs with corresponding PDCCHs) already scheduled by the base station up to the current serving cell and/or the current time unit. The order of each bit in the HARQ-ACK codebook corresponding to at least one of PDSCH reception(s), DCI(s) indicating SPS PDSCH release (deactivation), or DCI(s) indicating secondary cell dormancy may be determined by the time when the first DAI is received and the information of the first DAI. The first DAI may be included in a downlink DCI format.

In some examples, the second DAI may be a T-DAI (Total-DAI). The second DAI may indicate a total number of at least one of all PDSCH receptions, DCI indicating SPS PDSCH release (deactivation), or DCI indicating secondary cell dormancy. For example, the total number may be a total number of all serving cells up to the current time unit. For example, T-DAI may refer to: a total number of {serving cell, time unit} pairs scheduled by PDCCH(s) up to the current time unit within a time window (which may also include a number of PDCCHs for indicating SPS release); or a total number of PDSCH transmissions up to the current time unit; or a total number of {serving cell, time unit} pairs in which PDSCH transmission(s) related to PDCCH(s) (e.g., scheduled by the PDCCH) and/or PDCCH(s) (e.g., a PDCCH indicating SPS release and/or a PDCCH indicating secondary cell dormancy) is present, up to the current serving cell and/or the current time unit; or a total number of PDSCHs with corresponding PDCCHs and/or PDCCHs (e.g., PDCCHs indicating SPS release and/or PDCCHs indicating secondary cell dormancy) already scheduled by a base station up to the current serving cell and/or the current time unit; or a total number of PDSCHs (the PDSCHs are PDSCHs with corresponding PDCCHs) already scheduled by the base station up to the current serving cell and/or the current time unit; or a total number of time units with PDSCH transmissions (for example, the PDSCHs are PDSCHs with corresponding PDCCHs) already scheduled by the base station up to the current serving cell and/or the current time unit. The second DAI may be included in the downlink DCI format and/or an uplink DCI format. The second DAI included in the uplink DCI format is also referred to as UL DAI.

In the following examples, the first DAI as the C-DAI and the second DAI as the T-DAI are taken as an example for illustration, but the examples are not limited thereto.

Tables 1 and 2 show a correspondence between the DAI field and $V_{T\text{-}DAI,m}$ or $V_{C\text{-}DAI,c,m}$. Numbers of bits of the C-DAI and T-DAI are limited.

For example, in a case where the C-DAI or T-DAI is represented with 2 bits, the value of the C-DAI or T-DAI in the DCI may be determined by equations in Table 1. $V_{T\text{-}DAI,m}$ is the value of the T-DAI in DCI received in a PDCCH Monitoring Occasion (MO) m, and $V_{C\text{-}DAI,c,m}$ is the value of the C-DAI in DCI for a serving cell c received in the PDCCH monitoring occasion m. Both $V_{T\text{-}DAI,m}$ and $V_{C\text{-}DAI,c,m}$ are related to a number of bits of the DAI field in the DCI. MSB is the Most Significant Bit and LSB is the Least Significant Bit.

TABLE 1

| MSB, LSB of DAI Field | $V_{T\text{-}DAI,\,m}$ or $V_{C\text{-}DAI,\,c,\,m}$ | Y |
|---|---|---|
| 0, 0 | 1 | (Y − 1) mod 4 + 1 = 1 |
| 0, 1 | 2 | (Y − 1) mod 4 + 1 = 2 |
| 1, 0 | 3 | (Y − 1) mod 4 + 1 = 3 |
| 1, 1 | 4 | (Y − 1) mod 4 + 1 = 4 |

For example, when the C-DAI or T-DAI is 1, 5 or 9, as shown in Table 1, all of the DAI field are indicated with "00", and the value of $V_{T\text{-}DAI,m}$ or $V_{C\text{-}DAI,c,m}$ is represented as "1" by the equation in Table 1. Y may represent the value of the DAI corresponding to the number of DCIs actually transmitted by the base station (the value of the DAI before conversion by the equation in the table).

For example, in a case where the C-DAI or T-DAI in the DCI is 1 bit, values greater than 2 may be represented by equations in Table 2.

TABLE 2

| DAI field | $V_{T\text{-}DAI,\,m}$ or $V_{C\text{-}DAI,\,c,\,m}$ | Y |
|---|---|---|
| 0 | 1 | (Y − 1) mod 2 + 1 = 1 |
| 1 | 2 | (Y − 1) mod 2 + 1 = 2 |

It should be noted that, unless the context clearly indicates otherwise, all or one or more of the methods, steps and operations described in embodiments of the disclosure may be specified by protocols and/or configured by higher layer signaling and/or indicated by dynamic signaling. The dynamic signaling may be PDCCH and/or DCI and/or DCI format. For example, SPS PDSCH and/or CG PUSCH may be dynamically indicated in corresponding activated DCI/DCI format/PDCCH. All or one or more of the described methods, steps and operations may be optional. For example, if a certain parameter (e.g., parameter X) is configured, the UE performs a certain approach (e.g., approach A), otherwise (if the parameter, e.g., parameter X, is not configured), the UE performs another approach (e.g., approach B).

It should be noted that, a PCell (Primary Cell) or PSCell (Primary Secondary Cell) in embodiments of the disclosure may be used interchangeably with a cell having a PUCCH.

It should be noted that, methods for downlink in embodiments of the disclosure may also be applicable to uplink, and methods for uplink may also be applicable to downlink. For example, a PDSCH may be replaced with a PUSCH, a SPS PDSCH may be replaced with CG PUSCH, and downlink symbols may be replaced with uplink symbols, so that methods for downlink may be applicable to uplink.

It should be noted that, methods applicable to scheduling of multiple PDSCHs/PUSCHs in embodiments of the disclosure may also be applicable to a PDSCH/PUSCH transmission with repetitions. For example, a PDSCH/PUSCH of multiple PDSCH/PUSCHs may be replaced by a repetition of multiple repetitions of the PDSCH/PUSCH transmission.

It should be noted that, in methods of the disclosure, a PDCCH and/or a DCI and/or a DCI format schedules multiple PDSCHs/PUSCHs, which may be multiple PDSCHs/PUSCHs on a same serving cell and/or multiple PDSCHs/PUSCHs on different serving cells.

It should be noted that, the multiple manners described in the disclosure may be combined in any order. In a combination, a manner may be performed one or more times.

It should be noted that, the multiple steps in the methods of the disclosure may be implemented in any order.

The UE may be configured to receive a unicast PDSCH and a multicast PDSCH simultaneously, and when the reception of the unicast PDSCH and the multicast PDSCH goes beyond a UE capability, how to perform downlink reception (for example, how to receive the PDSCH) is a problem to be solved.

In some implementations, the UE may be configured to receive the unicast PDSCH and/or the multicast PDSCH. The UE may indicate a manner in which the UE can receive the PDSCH through UE capability reporting. For example, the UE may report capabilities related to the PDSCH reception, such as at least one of UE capabilities 1 to 17 described below.

UE capability 1 (also referred to as a first UE capability in the embodiments of the disclosure; for example, 3GPP UE capability "FDM-ed unicast PDSCH and group-common PDSCH"): FDM (frequency domain multiplexing)-based (e.g., FDM-ed) unicast and multicast PDSCHs may be received. For example, the UE may receive at most C1 (e.g., a maximum number C1 of) unicast PDSCHs and at most C2 (e.g., a maximum number C2 of) multicast PDSCHs in a slot. C1 and C2 may be positive integers. For example, C1=1, and C2=1.

UE capability 2 (also referred to as a second UE capability in the embodiments of the disclosure; for example, 3GPP UE capability "Intra-slot TDM-ed unicast PDSCH and group-common PDSCH"): within a time unit (e.g., slot), TDM (time domain multiplexing)-based (e.g., TDM-ed) unicast and multicast PDSCHs may be received. For example, the UE may receive at most 1 unicast PDSCH and at most 1 multicast PDSCH in a slot. For example, the UE may receive at most M (M>1) TDM-based (e.g., TDM-ed) unicast PDSCHs and at most 1 multicast PDSCH in a slot on a serving cell. For example, the UE may receive at most N (N>1) TDM-based multicast PDSCHs in a slot on a serving cell. For example, the UE may receive at most K (K>1) TDM-based unicast PDSCHs and at most L (L>1) multicast PDSCHs in a slot on a serving cell. For another example, a total number of unicast PDSCHs and multicast PDSCHs that UE can receive in a slot is one of {2,4,7}. The UE may report one of {2,4,7} through the UE capability reporting to indicate the total number (e.g., maximum total number) of unicast PDSCHs and multicast PDSCHs that the UE can receive at most in a slot.

UE capability 3 (also referred to as a third UE capability in the embodiments of the disclosure; for example, 3GPP UE capability "dynamic scheduling for multicast"): the multicast PDSCH (e.g., dynamically scheduled multicast PDSCH) may be received.

UE capability 4 (also referred to as a fourth UE capability in the embodiments of the disclosure): when a unicast PDSCH conflicts or collides with a multicast PDSCH, the UE receives the unicast PDSCH.

UE capability 5 (also referred to as a fifth UE capability in the embodiments of the disclosure): when a unicast PDSCH collides with a multicast PDSCH, the UE receives the multicast PDSCH.

UE capability 6 (also referred to as a sixth UE capability in the embodiments of the disclosure): when a unicast PDSCH scheduled by DCI collides with a multicast PDSCH, the UE receives the unicast PDSCH.

UE capability 7 (also referred to as a seventh UE capability in the embodiments of the disclosure): when a unicast PDSCH scheduled by DCI collides with a multicast PDSCH scheduled DCI, the UE receives the unicast PDSCH.

UE capability 8 (also referred to as an eighth UE capability in the embodiments of the disclosure): when a unicast PDSCH scheduled by DCI collides with a multicast SPS PDSCH, the UE receives the unicast PDSCH.

UE capability 9 (also referred to as a ninth UE capability in the embodiments of the disclosure): when a unicast SPS PDSCH collides with a multicast SPS PDSCH, the UE receives the unicast PDSCH.

UE capability 10 (also referred to as a tenth UE capability in the embodiments of the disclosure): when a unicast SPS PDSCH collides with a multicast PDSCH, the UE receives the unicast PDSCH.

UE capability 11 (also referred to as an eleventh UE capability in the embodiments of the disclosure): when a unicast SPS PDSCH collides with a multicast PDSCH scheduled by DCI, the UE receives the unicast PDSCH.

UE capability 12 (also referred to as a twelfth UE capability in the embodiments of the disclosure): when a multicast PDSCH scheduled by DCI collides with a unicast PDSCH scheduled by DCI, the UE receives the multicast PDSCH.

UE capability 13 (also referred to as a thirteenth UE capability in the embodiments of the disclosure): when a multicast PDSCH scheduled by DCI collides with a unicast SPS PDSCH, the UE receives the multicast PDSCH.

UE capability 14 (also referred to as a fourteenth UE capability in the embodiments of the disclosure): when a multicast SPS PDSCH collides with a unicast SPS PDSCH, the UE receives the multicast PDSCH.

UE capability 15 (also referred to as a fifteenth UE capability in the embodiments of the disclosure): when a multicast SPS PDSCH collides with a unicast PDSCH, the UE receives the multicast PDSCH.

UE capability 16 (also referred to as a sixteenth UE capability in the embodiments of the disclosure): when a multicast SPS PDSCH collides with a unicast PDSCH scheduled by DCI, the UE receives the multicast PDSCH.

UE capability 17 (also referred to as a seventeenth UE capability in the embodiments of the disclosure): when a multicast PDSCH scheduled by DCI collides with a unicast PDSCH, the UE receives the multicast PDSCH.

It should be noted that, "a unicast PDSCH collides with a multicast PDSCH" may mean that the unicast PDSCH overlaps with the multicast PDSCH in time domain and/or frequency domain, and/or the scheduled unicast PDSCH and multicast PDSCH go beyond the UE capability.

In some implementations, PDSCHs scheduled to be received in a time unit (e.g., slot) may go beyond the UE capability. In some implementations, for example, if at least one of the following conditions COND1 to COND4 is satisfied, it may be considered that the PDSCHs scheduled to be received in a slot may go beyond the UE capability. In the disclosure, the expression "PDSCHs scheduled to be received in a slot go beyond the UE capability" may mean or be equivalent to at least one of conditions COND1 to COND4 being satisfied.

Condition COND 1: in a slot on a serving cell, a number of scheduled unicast PDSCHs is greater than or greater than or equal to F1 and/or a number of scheduled multicast PDSCHs is greater than or greater than or equal to F2, where F1 and F2 are integers. F1 and/or F2 may be a specified value. Additionally or alternatively, F1 and/or F2 may be determined based on the UE capability. For example, when the UE reports the first UE capability, and the first UE capability indicates that the UE can receive (for example, support receiving) at most C1=1 unicast PDSCH and at most C2=1 multicast PDSCH in a slot, it may be determined that F1 is equal to 1 and F2 is equal to 1. For another example, the UE does not report the first UE capability and the UE does not report the second UE capability. The UE reports the third UE capability. It may be determined that F1 is equal to 1 and F2 is equal to 1. If a unicast PDSCH and a multicast PDSCH are scheduled in a slot on a serving cell, it may be considered that the PDSCHs scheduled to be received in a slot may go beyond the UE capability.

Condition COND2: in a slot on a serving cell, a number of scheduled unicast PDSCHs is greater than or greater than or equal to T1 and/or a number of scheduled multicast PDSCHs is greater than or greater than or equal to T2 and/or a number of scheduled PDSCHs (e.g., a sum of the number of the scheduled unicast PDSCHs and the number of the scheduled multicast PDSCHs) is greater than or greater than or equal to T3, where T1, T2 and T3 are integers. Each of T1, T2 or T3 may be a specified value. Additionally or alternatively, each of T1, T2 or T3 may be determined based on the UE capability. For example, when the UE reports the second UE capability, and the second UE capability indicates that a total number of TDM-ed unicast and multicast PDSCHs that the UE can (for example, support) receive in a slot is at most 7, it may be determined that T3 is equal to 7.

Condition COND3: in a slot on a serving cell, a number of scheduled unicast PDSCHs is greater than or greater than or equal to M1 and/or a number of scheduled multicast PDSCHs is greater than or greater than or equal to M2 and/or at least one of the scheduled unicast PDSCHs overlaps with at least one of the scheduled multicast PDSCHs in time domain and/or at least one of the scheduled unicast PDSCHs overlaps with at least one of the scheduled multicast PDSCHs in both time domain and frequency domain. For example, the unicast PDSCH and the multicast PDSCH have a same TRP (e.g., same 3GPP parameter coresetPoolIndex). For example, M1 and/or M2 may be a specified value. Additionally or alternatively, M1 and/or M2 may be determined based on the first UE capability and/or the second UE capability reported by the UE.

Condition COND4: multiple scheduled PDSCHs (for example, 2 PDSCHs; for another example, one unicast PDSCH and one multicast PDSCH) overlap in both time domain and frequency domain. For example, the multiple PDSCHs are multiple PDSCHs with the same TRP (e.g., same 3GPP parameter coresetPoolIndex).

It should be noted that, in each of the conditions described above, the scheduled PDSCHs may be PDSCHs (e.g., TDM-based PDSCHs) that are not overlap in time domain. Alternatively, the scheduled PDSCHs may also be PDSCHs that overlap in time domain.

It should be noted that, in the embodiments of the disclosure, "PDSCHs scheduled to be received in a slot" may be replaced by "PDSCHs scheduled to be received in a slot on a serving cell".

When PDSCHs scheduled to be received in a slot go beyond the UE capability, it needs to consider how to determine that the UE receives PDSCHs. For example, "determining that the UE receives PDSCHs" or "determining for the UE to receive PDSCHs" may be understood as determining PDSCH(s) to be received (or decoded) by the UE. Or, "determining that the UE receives PDSCHs" or "determining for the UE to receive PDSCHs" may be understood as determining PDSCH(s) that the UE expects to receive (or decode). When determining that the UE receives PDSCHs, the UE may determine (e.g., select) PDSCHs to be received or decoded from the PDSCHs scheduled to be received. It should be noted that, the intermediate step determines the PDSCHs to be received or the PDSCHs for reception, and the reception of the corresponding PDSCHs may be cancelled or not performed in the subsequent steps.

In some implementations, determining that the UE receives PDSCHs may be based on at least one of the following manners MN1A to MN1K (MN1A, MN1B, MN1C, MN1D, MN1E, MN1F, MN1G, MN1H, MN1I, MN1J, and MN1K). For example, it may be specified by protocols and/or configured by higher layer signaling. For example, if PDSCHs scheduled to be received in a slot go beyond the UE capability, it may be determined that the UE receives PDSCHs by at least one of the following manners MN1A to MN1K. For example, if a predefined condition is satisfied, it may be determined that the UE receives PDSCHs by at least one of the following manners MN1A to MN1K. The predefined condition may include at least one of conditions COND5 to COND15.

Condition COND5: a number of scheduled unicast SPS PDSCHs is greater than or greater than or equal to F1. For example, F1 may be determined based on the first UE capability reported by the UE as described above.

Condition COND6: a number of scheduled multicast PDSCHs is greater than or greater than or equal to F2. For example, F2 may be determined based on the first UE capability reported by the UE as described above.

Condition COND7: at least one unicast SPS PDSCH of the scheduled unicast SPS PDSCHs overlaps with at least one multicast PDSCH of the scheduled multicast PDSCHs in time domain.

Condition COND8: at least one unicast SPS PDSCH of the scheduled unicast SPS PDSCHs overlaps with at least one multicast PDSCH of received multicast PDSCHs in frequency domain.

Condition COND9: at least one unicast SPS PDSCH of the scheduled unicast SPS PDSCHs overlaps with at least one multicast PDSCH of the scheduled multicast PDSCHs in both time domain and frequency domain.

Condition COND10: at least one unicast SPS PDSCH of the scheduled unicast SPS PDSCHs does not overlap with at least one multicast PDSCH of the received multicast PDSCHs in time domain.

Condition COND 11: at least one unicast SPS PDSCH of the scheduled unicast SPS PDSCHs does not overlap with at least one multicast PDSCH of the scheduled multicast PDSCHs in frequency domain.

Condition COND12: a parameter indicating that FDM-ed unicast and multicast PDSCHs may be received is configured (or not configured) by higher layer signaling.

Condition COND13: a parameter indicating that a unicast (or multicast) PDSCH is received when the unicast PDSCH collides with the multicast PDSCH (for example, the unicast PDSCH overlaps with the multicast PDSCH in time domain and/or frequency domain; for another example, the scheduled unicast PDSCH and multicast PDSCH go beyond the UE capability) is configured (or not configured) by higher layer signaling.

Condition COND14: a parameter indicating that a unicast (or multicast) PDSCH scheduled by a PDCCH may cancel a multicast (or unicast) SPS PDSCH is configured (or not configured) by higher layer signaling.

Condition COND15: a predefined timing condition.

Condition COND16: the UE reports a capability to support receiving a multicast PDSCH.

Condition COND17: the UE does not report a capability (e.g., one or more of the first UE capability, the second UE capability, the third UE capability, or the capability to support receiving a multicast PDSCH).

Manner MN1 A

In manner MN1A, it may be specified by protocols and/or configured by higher layer signaling that the UE does not expect that unicast PDSCH(s) and/or multicast PDSCH(s) received in a slot go beyond the UE capability. Or, the UE does not expect that scheduled unicast PDSCH(s) and multicast PDSCH(s) overlap in both time domain and frequency domain. Or, UE does not expect that scheduled unicast PDSCH(s) and multicast PDSCH(s) overlap in time domain. For example, the UE does not report the first UE capability.

For example, UE does not expect that a unicast PDSCH scheduled by DCI overlaps with a multicast PDSCH scheduled by DCI in both time domain and frequency domain.

It should be noted that, manner MN1A may be performed after MN1B and/or MN1C to be described below.

It should be noted that, the PDSCH in this scheme may be replaced by the SPS PDSCH.

The method clarifies the behavior of the UE, improves the reliability of the downlink data transmission, and improves the flexibility of the network scheduling, thereby improving the spectrum efficiency of the system.

Manner MN1B

In manner MN1B, determining to receive PDSCHs may be based on one or more of the following steps.

Step 1: determine to receive unicast SPS PDSCH(s) and/or multicast SPS PDSCH(s).

Step 2: determine to receive unicast PDSCH(s) and/or multicast PDSCH(s). For example, the PDSCH may be a SPS PDSCH and/or a PDSCH scheduled by DCI.

The method is simple to implement, which can reduce the complexity of the UE implementation, clarifies the behavior of the UE, and improves the reliability of the downlink transmission.

Manner MN1C

In manner MN1C, determining to receive PDSCHs may be based on one or more of the following steps.

Step 1: determine to receive unicast PDSCH(s). For example, the UE may assume that there is no multicast PDSCH (or there is only the unicast PDSCH(s)), and then determine to receive the unicast PDSCH(s).

Step 2: determine to receive multicast PDSCH(s). For example, the UE may assume that there is no unicast PDSCH (or there is only the multicast PDSCH(s)), and then determine to receive the multicast PDSCH(s).

It should be noted that the order of step 1 and step 2 may be exchanged.

For example, a PDSCH may include a SPS PDSCH and/or a PDSCH scheduled by DCI.

For example, other manners of the disclosure (e.g., manner MN1B) may be performed after manner MN1C is performed.

Manner MN1D

In manner MN1D, determining to receive PDSCHs may be based on one or more of the following steps.

Step 1: determine to receive a PDSCH with the higher priority. For example, it may be determined according to other embodiments of the disclosure. For example, step 1 may be implemented by replacing the unicast (SPS) PDSCH by a (SPS) PDSCH with the higher (or lower) priority and replacing the multicast (SPS) PDSCH by a (SPS) PDSCH with the lower (or higher) priority in the manners described in other embodiments.

Step 2: determine to receive a PDSCH with the lower priority. For example, it may be determined according to other embodiments of the disclosure. For example, step 2 may be implemented by replacing the unicast (SPS) PDSCH by a (SPS) PDSCH with the higher (or lower) priority and replacing the multicast (SPS) PDSCH by s (SPS) PDSCH with the lower (or higher) priority in the manners described in other embodiments.

It should be noted that the order of step 1 and step 2 may be exchanged.

It should be noted that, a priority of a PDSCH may be configured by higher layer signaling (for example, for a priority of a SPS PDSCH) and/or indicated by dynamic signaling (for example, for a priority of a PDSCH scheduled by DCI).

For example, if a PDSCH with the higher priority determined for reception and a PDSCH with the lower priority determined for reception do not go beyond the UE capability, the UE receives the PDSCH with the higher priority and the PDSCH with the lower priority.

For example, if a PDSCH with the higher priority determined for reception and a PDSCH with the lower priority determined for reception go beyond the UE capability, the UE may determine to receive PDSCHs according to a predefined method. For example, the UE only receives the PDSCH with the higher priority. For another example, it may be determined according to the methods in other embodiments of the disclosure. The reception of PDSCHs may be determined by replacing the unicast (SPS) PDSCH by the PDSCH with the higher (or lower) priority and replacing the multicast (SPS) PDSCH by the PDSCH with the lower (or higher) priority in the manners described in other embodiments.

The method can improve the reliability of the downlink transmission of the data with the higher priority.

Manner MN1E

In manner MN1E, determining to receive PDSCHs may be based on one or more of the following steps.

Step 1: the UE may receive unicast PDSCH(s) (for example, the unicast PDSCH determined to be received according to other embodiments of the disclosure).

Step 2: the UE determines whether multicast PDSCH(s) may be received. For example, the PDSCH may be determined to be received by at least one of the following manners MN2A to MN2C (MN2A, MN2B, and MN2C).

Manner MN2A

In manner MN2A, the UE determines whether a multicast PDSCH may be received based on whether the multicast PDSCH overlaps with at least one of unicast PDSCHs in time domain and/or frequency domain.

For example, if a multicast PDSCH overlaps with a unicast PDSCH in time domain and/or frequency domain, the UE may not receive the multicast PDSCH. Otherwise, the UE may receive the multicast PDSCH.

For example, the UE does not report UE capability 1, and if a multicast PDSCH overlaps with a unicast PDSCH in time domain, the UE may not receive the multicast PDSCH.

For example, the UE reports UE capability 1, and if a multicast PDSCH overlaps with a unicast PDSCH in both time domain and frequency domain, the UE may not receive the multicast PDSCH.

For example, the UE reports UE capability 1, and if a multicast PDSCH does not overlap with a unicast PDSCH in frequency domain, the UE may receive the multicast PDSCH.

Manner MN2B

In manner MN2B, the UE may not receive multicast PDSCH(s).

Manner MN2C

In manner MN2C, whether a multicast PDSCH may be received is determined according to a number of unicast PDSCHs determined to be received.

For example, if the number of unicast PDSCHs determined to be received is a first predefined value (for example, the first predefined value may be 0), the UE may receive the multicast PDSCH. Otherwise, the UE may not receive the multicast PDSCH. For example, the UE does not report UE capability 1 and UE capability 2, and/or the UE reports UE capability 3, and if the number of unicast PDSCHs determined to be received is 0, the UE may receive the multicast PDSCH. Otherwise, the UE may not receive the multicast PDSCH.

For example, if the number of unicast PDSCHs determined to be received is greater than or greater than or equal to the first predefined value, the UE may not receive the multicast PDSCH.

It should be noted that, this manner may be combined with other manners. For example, the PDSCH determined to be received in this manner may be a PDSCH of an intermediate process.

The method is simple to implement, which can reduce the complexity of the UE implementation, clarifies the behavior of the UE, and improves the reliability of the downlink transmission.

Manner MN1F

In manner MN1F, determining to receive PDSCHs may be based on one or more of the following steps.

Step 1: the UE receives multicast PDSCH(s) (for example, the multicast PDSCH determined to be received according to other embodiments of the disclosure).

Step 2: the UE determines whether unicast PDSCH(s) may be received.

For example, a PDSCH may be determined to be received based on at least one of the following manners MN3A to MN3C (MN3A, MN3B, MN3C).

Manner MN3A

In manner MN3A, the UE determines whether a unicast PDSCH may be received based on whether the unicast PDSCH overlaps with at least one of the multicast PDSCHs in time domain and/or frequency domain.

For example, if a unicast PDSCH overlaps with a multicast PDSCH in time domain and/or frequency domain, the UE may not receive the unicast PDSCH. Otherwise, the UE may receive the unicast PDSCH.

For example, the UE does not report UE capability 1, and if a unicast PDSCH overlaps with a multicast PDSCH in time domain, the UE may not receive the unicast PDSCH.

For example, the UE reports UE capability 1, and if a unicast PDSCH overlaps with a multicast PDSCH in both time domain and frequency domain, the UE may not receive the unicast PDSCH.

For example, the UE reports UE capability 1, and if a unicast PDSCH does not overlap with a multicast PDSCH in frequency domain, the UE may receive the unicast PDSCH.

Manner MN3B

In manner MN3B, the UE may not receive unicast PDSCH(s).

Manner MN3C

In manner MN3C, whether a unicast PDSCH may be received is determined according to a number of multicast PDSCHs determined to be received.

For example, if the number of multicast PDSCHs determined to be received is a second predefined value (for example, the second predefined value may be 0), the UE may receive the unicast PDSCH. Otherwise, the UE may not receive the unicast PDSCH. For example, the UE does not report UE capability 1 and UE capability 2, and/or the UE reports UE capability 3, and if the number of multicast PDSCHs determined to be received is 0, the UE may receive the unicast PDSCH. Otherwise, the UE may not receive the unicast PDSCH.

For example, if the number of multicast PDSCHs determined to be received is greater than or greater than or equal to the second predefined value, the UE may not receive the unicast PDSCH.

It should be noted that, this manner may be combined with other manners. For example, the PDSCH determined to be received in this manner may be a PDSCH of an intermediate process.

The method is simple to implement, which can reduce the complexity of the UE implementation, clarifies the behavior of the UE, and improves the reliability of the downlink transmission.

Manner MN1G

In manner MN1G, multicast PDSCHs may be regarded as unicast PDSCHs, and determining to receive PDSCHs may be then based on the method of receiving unicast PDSCHs. For example, if the UE does not report UE capability 1, multicast PDSCHs may be regarded as unicast PDSCHs, and determining to receive PDSCHs may be then based on the method of receiving unicast PDSCHs.

The method is simple to implement, which can reduce the complexity of the UE implementation, clarifies the behavior of the UE, improves the reliability of the downlink transmission, and improves the spectrum efficiency of the system.

Manner MN1H

In manner MN1H, when a unicast (or multicast) PDSCH scheduled by a PDCCH overlaps with a multicast (or unicast) SPS PDSCH in time domain and/or frequency domain: if a predefined condition (for example, the predefined condition may include a predefined timing condition) is satisfied, the UE receives the unicast (or multicast) PDSCH scheduled by the DCI, and the UE does not receive the multicast (or unicast) SPS PDSCH; and/or, if the predefined condition is not satisfied, the UE does not receive the unicast (or multicast) PDSCH scheduled by the DCI, and the UE receives the multicast (or unicast) SPS PDSCH. Or, the UE does not expect that the predefined timing condition is not satisfied.

For example, the predefined timing condition may be that an end (or starting) position (or symbol) of the PDCCH is earlier than an end (or starting) position (or symbol) of the SPS PDSCH by X time units (e.g., symbols). X may be specified by protocols and/or reported through the UE capability, for example, X is equal to 14. The embodiments of the disclosure are not limited to this, and any suitable timing conditions are possible. The method can improve the flexibility of the dynamic scheduling and improve the spectrum efficiency of the system.

Manner MN1I

In manner MN1I, it may be specified by protocols and/or configured by higher layer signaling that the UE does not expect to report UE capability 1 and UE capability 2 simultaneously. Or, if the UE reports UE capability 1 and UE capability 2 simultaneously, it may be specified by protocols that the UE capability is UE capability 1 (or UE capability 2).

The method is simple to implement and can reduce the complexity of the UE and base station implementation.

Manner MN1J

In manner MN1J, the UE determines to receive at most N dynamically scheduled PDSCHs, and N may be determined based on the UE capability (e.g., first UE capability and/or second UE capability) reported by the UE. For example, N may be determined to be equal to 2. For example, the UE determines to receive at most N dynamically scheduled PDSCHs according to the manners in other embodiments of the disclosure. If a number M of dynamically scheduled PDSCHs determined for reception is less than (or less than or equal to) N, the UE may determine to receive at most N-M SPS PDSCHs. For example, the UE determines to receive at most N-M SPS PDSCHs according to the manners in other embodiments of the disclosure.

The method can improve the flexibility of the dynamic scheduling and improve the spectrum efficiency of the system.

Manner MN1K

In manner MN1K, the UE is scheduled with a first PDSCH by a first PDCCH and a second PDSCH by a second PDCCH, where the first PDSCH overlaps with the second PDSCH in time domain and/or frequency domain. It may be specified by protocols that when a predefined condition is satisfied, the UE receives the second PDSCH (or first PDSCH) and the UE does not receive the first PDSCH (or second PDSCH). The predefined condition includes that the first PDCCH and/or the second PDCCH and the first PDSCH and/or the second PDSCH satisfy a predefined timing condition. The first PDSCH may be a unicast PDSCH (or multicast PDSCH), and the second PDSCH may be a multicast PDSCH (or unicast PDSCH). For example, the predefined timing condition may be that an end (or starting) position (or symbol) of the second PDCCH is earlier than an end (or starting) position (or symbol) of the first PDSCH by X time units (e.g., symbols). X may be specified by protocols and/or reported through the UE capability, for example, X is equal to 14. The method can improve the flexibility of the dynamic scheduling and improve the spectrum efficiency of the system.

In some implementations, the scheduled PDSCHs may need to satisfy a predefined limiting condition. The predefined limiting condition includes at least one of the following conditions LCOND1 to LCOND8.

Condition LCOND1: for any two HARQ process IDs (identifications) in a given scheduled cell, if the UE is scheduled to receive (for example, start receiving) a first PDSCH (e.g., a PDSCH scrambled by an RNTI for unicast PDSCHs) starting in a second symbol (e.g., symbol j) by a PDCCH (e.g., a PDCCH scrambled by the RNTI for unicast PDSCHs) ending in a first symbol (e.g., symbol i), the UE is not expected to be scheduled to receive a PDSCH (e.g., a PDSCH scrambled by the RNTI for unicast PDSCHs) starting earlier than end of the first PDSCH with a PDCCH (e.g., a PDCCH scrambled by the RNTI for unicast PDSCHs) that ends later than the first symbol (e.g., symbol i).

Condition LCOND2: if the UE does not support receiving FDM-ed unicast and multicast PDSCH per slot per carrier (or if the UE does not report a specific UE capability supported, for example, a capability of supporting FDM (e.g., the first UE capability described above); for another example, a capability of supporting OOO (out of order) HARQ. For example, for two PDSCHs with different HARQ process IDs, HARQ-ACK for a later PDSCH may be transmitted before HARQ-ACK for an earlier PDSCH). For any two HARQ process IDs in a given scheduled cell, if the UE is scheduled to receive (for example, start receiving) a first PDSCH (e.g., a PDSCH scrambled by an RNTI for unicast PDSCHs) starting in a second symbol (e.g., symbol j) by a PDCCH (e.g., a PDSCH scrambled by the RNTI for unicast PDSCHs) ending in a first symbol (e.g., symbol i), the UE is not expected to be scheduled to receive a PDSCH (e.g., a PDSCH scrambled by the RNTI for unicast PDSCHs) starting earlier than end of the first PDSCH with a PDCCH (e.g., a PDCCH scrambled by the RNTI for unicast PDSCHs) that ends later than the first symbol (e.g., symbol i).

It should be noted that, "unicast" in conditions LCOND1 and/or LCOND2 may be replaced by "multicast". "Unicast" in conditions LCOND1 and/or LCOND2 may also be replaced by "unicast and/or multicast".

Condition LCOND3: for any two HARQ process IDs in a given scheduled cell, if the UE is scheduled to receive (for example, start receiving) a first PDSCH (e.g., a PDSCH scrambled by an RNTI for unicast PDSCHs) starting in a second symbol (e.g., symbol j) by a first PDCCH (e.g., a PDCCH scrambled by the RNTI for unicast PDSCHs) ending in a first symbol (e.g., symbol i), the UE is not expected to be scheduled to receive a second PDSCH (e.g., a PDSCH scrambled by the RNTI for unicast PDSCHs) starting earlier than end of the first PDSCH with a second PDCCH (e.g., a PDCCH scrambled by the RNTI for unicast PDSCHs) that ends later than the first symbol (e.g., symbol i); and/or, if the UE is scheduled to receive (for example, start receiving) a third PDSCH (e.g., a PDSCH scrambled by an RNTI for multicast PDSCHs) starting in a fourth symbol (e.g., symbol j') by a PDCCH (e.g., a PDCCH scrambled by the RNTI for multicast PDSCHs) ending in a third symbol (e.g., symbol i'), the UE is not expected to be scheduled to receive a fourth PDSCH (e.g., a PDSCH scrambled by the RNTI for multicast PDSCHs) starting earlier than end of the third PDSCH with a fourth PDCCH (e.g., a PDCCH scrambled by the RNTI for multicast PDSCHs) that ends later than the third symbol (e.g., symbol i').

For example, if the UE does not support receiving FDM-ed unicast and multicast PDSCH per slot per carrier (or if the UE does not report a specific UE capability supported, for example, a capability of supporting FDM (e.g., the first UE capability described above), and for another example, a capability of supporting OOO HARQ), the scheduling of the PDSCH may need to satisfy condition LCOND3.

Condition LCOND4: for any HARQ process ID in a given scheduled cell, the UE does not expect to receive a unicast PDSCH that overlaps with another unicast PDSCH in time domain; and/or, the UE does not expect to receive a multicast PDSCH that overlaps with another multicast PDSCH in time domain.

For example, if the UE supports receiving FDM-ed unicast and multicast PDSCH per slot per carrier (or if the UE reports a specific UE capability supported, for example, a capability of supporting FDM (e.g., the first UE capability described above), and for another example, a capability of supporting OOO HARQ), the scheduling of the PDSCH may need to satisfy condition LCOND4.

Condition LCOND5: for any HARQ process ID in a given scheduled cell, the UE does not expect to receive a unicast or multicast PDSCH that overlaps with another unicast or multicast PDSCH in time domain.

For example, if the UE does not support receiving FDM-ed unicast and multicast PDSCH per slot per carrier (or if the UE does not report a specific UE capability supported, for example, a capability of supporting FDM (e.g., the first UE capability described above), and for another example, a capability of supporting OOO HARQ), the scheduling of the PDSCH may need to satisfy condition LCOND5.

Condition LCOND6: for any HARQ process ID in a given scheduled cell, the UE does not expect to receive a unicast PDSCH that overlaps with another unicast PDSCH in both time domain and frequency domain.

Condition LCOND7: in a serving cell, if a PDSCH scheduled by a PDCCH scrambled by a RNTI for unicast PDSCHs partially or completely overlaps with one or more SPS PDSCHs (e.g., SPS PDSCHs scrambled by the RNTI for unicast PDSCHs) in time domain, the UE does not expect to decode the PDSCH scheduled by the PDCCH, except if an end position/symbol of the PDCCH scheduling the PDSCH is earlier than the earliest starting symbol of the SPS PDSCHs by at least N1 time units (for example, N1 may be 14, and the time units may be symbols), in which case the UE shall decode the PDSCH scheduled by the PDCCH; and/or, if a PDSCH scheduled by the PDCCH scrambled by the RNTI for multicast PDSCHs partially or completely overlaps with one or more SPS PDSCHs (e.g., SPS PDSCHs scrambled by the RNTI for multicast PDSCHs) in time domain, the UE does not expect to decode the PDSCH scheduled by the PDCCH, except if an end position/symbol of the PDCCH scheduling the PDSCH is earlier than the earliest starting symbol of the SPS PDSCHs by at least N1 time units (for example, N1 may be 14, and the time units may be symbols), in which case the UE shall decode the PDSCH scheduled by the PDCCH. For example, if the UE supports receiving FDM-ed unicast and multicast PDSCH per slot per carrier (or if the UE reports a specific UE capability supported, for example, a capability of supporting FDM (e.g., the first UE capability described above), and for another example, a capability of supporting OOO HARQ), the scheduling of the PDSCH may need to satisfy condition LCOND7.

Condition LCOND8: in a serving cell, if a PDSCH scheduled by a PDCCH scrambled by the RNTI for unicast PDSCHs partially or completely overlaps with one or more SPS PDSCHs (e.g., SPS PDSCHs scrambled by the RNTI for unicast or broadcast PDSCHs) in time domain, the UE does not expect to decode the PDSCH scheduled by the PDCCH, except if an end position/symbol of the PDCCH scheduling the PDSCH is earlier than the earliest starting symbol of the SPS PDSCHs by at least N1 time units (for example, N1 may be 14, and the time units may be symbols), in which case, the UE shall decode the PDSCH scheduled by the PDCCH. For example, if the UE does not support receiving FDM-ed unicast and multicast PDSCH per slot per carrier (or if the UE does not report a specific UE capability supported, for example, a capability of supporting FDM (e.g., the first UE capability described above), and for another example, a capability of supporting OOO HARQ), the scheduling of the PDSCH may need to satisfy condition LCOND8.

It should be noted that, the RNTI for unicast PDSCHs may be at least one of a C-RNTI, an MCS-C-RNTI or a CS-RNTI, and the RNTI for multicast PDSCHs may be at least one of a G-RNTI or a G-CS-RNTI.

It should be noted that, in the embodiments of the disclosure, "the UE does not support receiving FDM-ed unicast and multicast PDSCH per slot per carrier" or "the UE does not report UE capability 1" may be replaced by "a parameter indicating that FDM-ed unicast and multicast PDSCHs may be received is not configured by higher layer signaling".

It should be noted that, in the embodiments of the disclosure, "the UE supports receiving FDM-ed unicast and multicast PDSCH per slot per carrier" or "the UE reports UE capability 1" may be replaced by "a parameter indicating that FDM-ed unicast and multicast PDSCHs may be received is configured by higher layer signaling".

Figure 8:
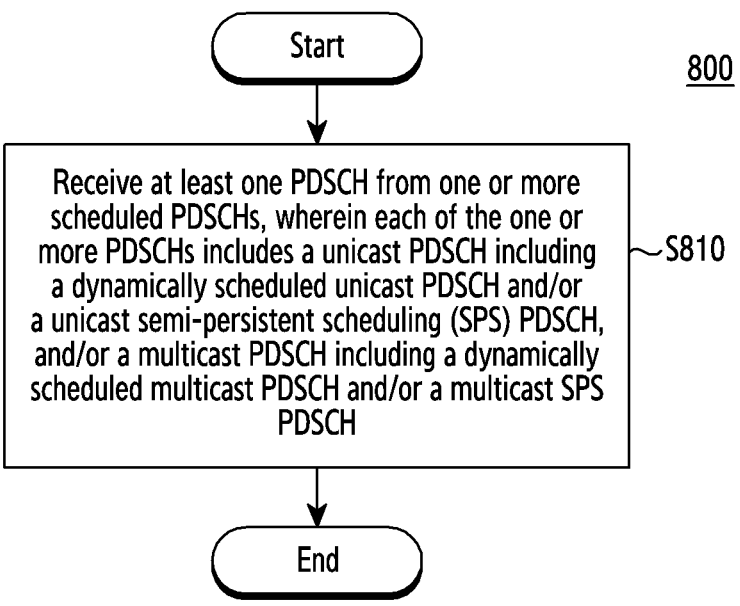
FIG. 8 illustrates a flowchart of a method performed by a terminal according to an embodiment of the disclosure.

FIG. 8 illustrates a flowchart of a method 800 performed by a terminal (e.g., UE) according to an embodiment of the disclosure.

Referring to FIG. 8, in operation 5810, at least one physical downlink shared channels (PDSCH) is received from one or more scheduled PDSCHs. Each of the one or more PDSCHs includes a unicast PDSCH including a dynamically scheduled unicast PDSCH and/or a unicast semi-persistent scheduling (SPS) PDSCH, and/or a multicast PDSCH including a dynamically scheduled multicast PDSCH and/or a multicast SPS PDSCH.

For example, the scheduled PDSCH may be a PDSCH scheduled by DCI, and/or a PDSCH (SPS PDSCH) that is configured to be received by higher layer signaling.

In some implementations, the method 800 may further include feeding back (for example, transmitting or reporting) hybrid automatic repeat request-acknowledgement (HARQ-ACK) information for the at least one received PDSCH.

In some implementations, the method 800 may include the methods or operations that may be performed by the terminal (e.g., UE) in various embodiments described above.

In some implementations, the receiving of the at least one PDSCH from the one or more scheduled PDSCHs includes receiving the at least one PDSCH based on a predefined condition.

In some implementations, the predefined condition may include one or more of:

a first capability (e.g., UE capability 1 or first UE capability described in the embodiments of the disclosure) and/or a second capability (e.g., UE capability 2 or second UE capability described in the embodiments of the disclosure) and/or a third capability (e.g., UE capability 3 or third UE capability described in the embodiments of the disclosure) and/or a fourth capability (e.g., UE capability 4 or fourth UE capability described in the embodiments of the disclosure) and/or a fifth capability (e.g., UE capability 5 or fifth UE capability described in the embodiments of the disclosure), where the first capability indicates a maximum number of unicast PDSCHs supported and/or a maximum number of multicast PDSCHs supported when the FDM-based unicast and multicast PDSCHs are received, the second capability indicates a maximum number of unicast PDSCHs supported, a maximum number of multicast PDSCHs supported and/or a maximum number of PDSCHs supported when the TDM-based unicast and multicast PDSCHs are received, the third UE capability indicates that receiving of the multicast PDSCH is supported, the fourth UE capability indicates that receiving of the unicast PDSCH when the unicast PDSCH collides with the multicast PDSCH is supported, and the fifth UE capability indicates that receiving of the multicast PDSCH when the unicast PDSCH collides with the multicast PDSCH is supported;

one or more of the first capability, the second capability, the third capability, the fourth capability or the fifth capability being not reported by the terminal;

a comparison result of a number of scheduled unicast SPS PDSCHs with a first value (e.g., F1 described in the embodiments of the disclosure);

a comparison result of a number of scheduled multicast SPS PDSCHs with a second value (F2 described in the embodiments of the disclosure); or whether at least one unicast SPS PDSCH of the scheduled unicast SPS PDSCHs overlaps with at least one multicast SPS PDSCH of the scheduled multicast SPS PDSCHs in time domain and/or frequency domain.

In some implementations, each of the first value or the second value may be determined based on the first capability and/or the second capability reported by the terminal.

In some implementations, the terminal may not expect that unicast PDSCHs and/or multicast PDSCHs received in a time unit go beyond a UE capability.

In some implementations, the terminal may not expect that a scheduled unicast PDSCH overlaps with a scheduled multicast PDSCH in time domain and/or frequency domain.

In some implementations, the receiving of the at least one PDSCH from the one or more scheduled PDSCHs may include at least one of:

receiving one or more unicast SPS PDSCHs and/or one or more multicast SPS PDSCHs from the one or more scheduled PDSCHs;

receiving one or more unicast PDSCHs and/or one or more multicast PDSCHs from the one or more scheduled PDSCHs;

receiving one or more unicast PDSCHs from the one or more scheduled PDSCHs and/or receiving one or more multicast PDSCHs from the one or more scheduled PDSCHs; or receiving one or more PDSCHs with a first priority from the one or more scheduled PDSCHs, and/or receiving one or more PDSCHs with a second priority from the one or more scheduled PDSCHs, wherein the second priority is lower than the first priority.

In some implementations, when the at least one PDSCH is received from the one or more scheduled PDSCHs, for at least one unicast PDSCH and at least one multicast PDSCH of the at least one PDSCH:

the at least one unicast PDSCH is received, and whether to receive a respective multicast PDSCH of the at least one multicast PDSCH is determined based on whether the multicast PDSCH overlaps with each of the at least one unicast PDSCH in at least one of time domain or frequency domain; or the at least one unicast PDSCH is received, and the at least one multicast PDSCH is not received.

In some implementations, when the at least one PDSCH is received from the one or more scheduled PDSCHs, for at least one unicast PDSCH and at least one multicast PDSCH of the at least one PDSCH:

the at least one multicast PDSCH is received, and whether to receive a respective unicast PDSCH of the at least one unicast PDSCH is determined based on whether the unicast PDSCH overlaps with each of the at least one multicast PDSCH in at least one of time domain or frequency domain; or the at least one multicast PDSCH is received, and the at least one unicast PDSCH is not received.

In some implementations, when the at least one PDSCH is received from the one or more scheduled PDSCHs, for the dynamically scheduled unicast PDSCH and the multicast SPS PDSCH of the at least one PDSCH, when the dynamically scheduled unicast PDSCH overlaps with the multicast SPS PDSCH in at least one of time domain or frequency domain, the dynamically scheduled unicast PDSCH is received and the multicast SPS PDSCH is not received in case that a predefined timing condition is satisfied, and/or the dynamically scheduled unicast PDSCH is not received and the multicast SPS PDSCH is received in case that the predefined timing condition is not satisfied.

In some implementations, when the at least one PDSCH is received from the one or more scheduled PDSCHs, for the dynamically scheduled multicast PDSCH and the unicast SPS PDSCH of the at least one PDSCH, when the dynamically scheduled multicast PDSCH overlaps with the unicast SPS PDSCH in at least one of time domain or frequency domain, the dynamically scheduled multicast PDSCH is received and the unicast SPS PDSCH is not received in case that a predefined timing condition is satisfied, and/or the dynamically scheduled multicast PDSCH is not received and the unicast SPS PDSCH is received in case that the predefined timing condition is not satisfied.

In some implementations, for any two hybrid automatic repeat request (HARQ) process identifications (IDs) in a given scheduled cell, in case that the terminal is scheduled to receive a first PDSCH starting in a second time unit by a first physical downlink control channel (PDCCH) ending in a first time unit, the terminal may not be expected to be scheduled to receive a second PDSCH starting earlier than end of the first PDSCH with a second PDCCH that ends later than the first time unit. Each of the first PDSCH and the second PDSCH may be one of the unicast PDSCH or the multicast PDSCH.

In some implementations, when the terminal does not support a capability to receive a FDM-ed PDSCH or a capability of out-of-order HARQ, and/or the terminal does not report the capability to receive the FDM-ed PDSCH or the capability of out-of-order HARQ, for any two HARQ process IDs in the given scheduled cell, in case that the terminal is scheduled to receive the first PDSCH starting in the second time unit by the first PDCCH ending in the first time unit, the terminal may not be expected to be scheduled to receive the second PDSCH starting earlier than the end of the first PDSCH with the second PDCCH that ends later than the first time unit. Each of the first PDSCH and the second PDSCH may be one of the unicast PDSCH or the multicast PDSCH.

In some implementations, for any HARQ process ID in a given scheduled cell:

the terminal may not expect to receive the unicast PDSCH, wherein the unicast PDSCH overlaps with another unicast PDSCH in at least one of time domain or frequency domain, and/or the terminal may not expect to receive the multicast PDSCH, wherein the multicast PDSCH overlaps with another multicast PDSCH in at least one of time domain or frequency domain.

In some implementations, in case that a PDSCH scheduled by a PDCCH scrambled by a radio network temporary identifier (RNTI) for the unicast PDSCH overlaps with one or more SPS PDSCHs in time domain in a serving cell, the terminal may not expect to decode the PDSCH scheduled by the PDCCH, and/or in case that the PDSCH scheduled by the PDCCH ends at least N1 time units before the earliest starting time unit of the one or more SPS PDSCHs, the terminal may decode the PDSCH scheduled by the PDCCH, where N1 is an integer greater than (or greater than or equal to) zero.

In some implementations, in case that a PDSCH scheduled by a PDCCH scrambled by an RNTI for the multicast PDSCH overlaps with one or more SPS PDSCHs in time domain in a serving cell, the terminal may not expect to decode the PDSCH scheduled by the PDCCH, and/or in case that the PDSCH scheduled by the PDCCH ends at least N2 time units before the earliest starting time unit of the SPS PDSCHs, the terminal may decode the PDSCH scheduled by the PDCCH, where N2 is an integer greater than (or greater than or equal to) zero.

Figure 9:
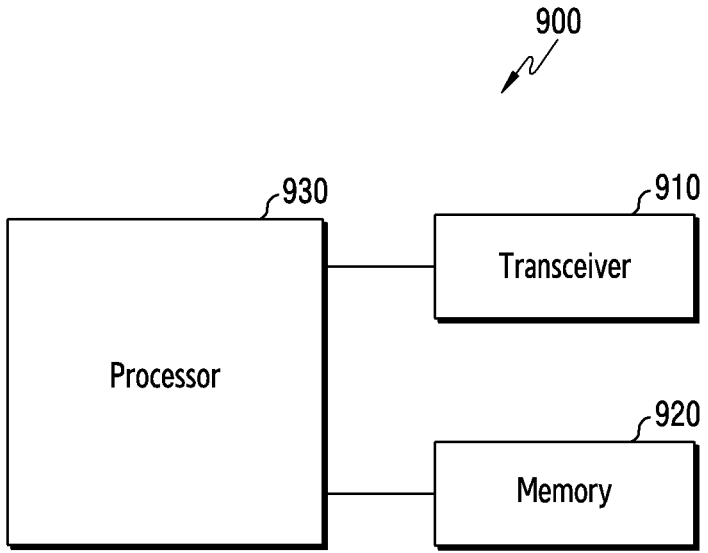
FIG. 9 illustrates a block diagram of a first transceiving node according to an embodiment of the disclosure.

FIG. 9 illustrates a block diagram of a first transceiving node 900 according an embodiment of the disclosure.

Referring to FIG. 9, the first transceiving node 900 according to an embodiment may include a transceiver 910, a memory 920, and a processor 930. the first transceiving node 900 may be a base station. The transceiver 910, the memory 920, and the processor 930 of the base station may operate according to a communication method of the base station described above. However, the components of the base station are not limited thereto. For example, the base station may include more or fewer components than those described above. In addition, the processor 930, the transceiver 910, and the memory 920 may be implemented as a single chip. Also, the processor 930 may include at least one processor. Furthermore, the first transceiving node 900 of FIG. 9 corresponds to the gNB 102 of the FIG. 3B.

The transceiver 910 collectively refers to a base station receiver and a base station transmitter, and may transmit/receive a signal to/from a terminal. The signal transmitted or received to or from the terminal may include control information and data. The transceiver 910 may include a RF transmitter for up-converting and amplifying a frequency of a transmitted signal, and a RF receiver for amplifying low-noise and down-converting a frequency of a received signal. However, this is only an example of the transceiver 910 and components of the transceiver 910 are not limited to the RF transmitter and the RF receiver.

Also, the transceiver 910 may receive and output, to the processor 930, a signal through a wireless channel, and transmit a signal output from the processor 930 through the wireless channel.

The memory 920 may store a program and data required for operations of the base station. Also, the memory 920 may store control information or data included in a signal obtained by the base station. The memory 920 may be a storage medium, such as read-only memory (ROM), random access memory (RAM), a hard disk, a CD-ROM, and a DVD, or a combination of storage media.

The processor 930 may control a series of processes such that the base station operates as described above. For example, the transceiver 910 may receive a data signal including a control signal transmitted by the terminal, and the processor 930 may determine a result of receiving the control signal and the data signal transmitted by the terminal.

The transceiver 910 may be configured to transmit first data and/or first control signaling to a second transceiving node and receive second data and/or second control signaling from the second transceiving node in a time unit.

The processor 930 may be an application specific integrated circuit or at least one processor. The processor 930 may be configured to control the overall operation of the first transceiving node 900, including controlling the transceiver 910 to transmit the first data and/or the first control signaling to the second transceiving node and receive the second data and/or the second control signaling from the second transceiving node in a time unit.

In some implementations, the processor 930 may be configured to perform one or more of operations in the methods of various embodiments described above.

In the following description, a base station is taken as an example (but not limited thereto) to illustrate the first transceiving node 900, a UE is taken as an example (but not limited thereto) to illustrate the second transceiving node. Downlink data and/or downlink control signaling (but not limited thereto) are used to illustrate the first data and/or the first control signaling. A HARQ-ACK codebook may be included in the second control signaling, and uplink control signaling (but not limited thereto) is used to illustrate the second control signaling.

Figure 10:
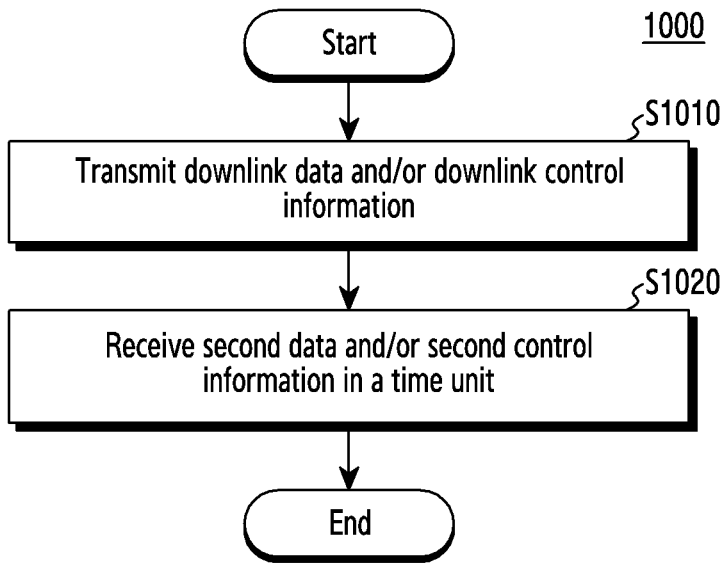
FIG. 10 illustrates a flowchart of a method performed by a base station according to an embodiment of the disclosure.

FIG. 10 illustrates a flowchart of a method 1000 performed by a base station according to an embodiment of the disclosure.

Referring to FIG. 10, operation S1010, the base station transmits downlink data and/or downlink control information.

Operation 51020, the base station receives second data and/or second control information from a UE in a time unit.

For example, the method 1000 may include one or more of the operations performed by the base station described in various embodiments of the disclosure.

In an embodiment, a method performed by a user equipment (UE) in a wireless communication system, the method comprising: transmitting, to a base station, UE capability information indicating that the UE supports a frequency division multiplexing (FDM) between a unicast physical downlink shared channel (PDSCH) and a group-common PDSCH in a slot and receiving, from the base station, a first PDSCH that is the unicast PDSCH and a second PDSCH that is the group-common PDSCH, which are FDMed in the slot based on the UE capability information.

In an embodiment, wherein the group-common PDSCH comprises a multicast PDSCH.

In an embodiment, wherein the group-common PDSCH comprises a broadcast PDSCH.

In an embodiment, wherein the first PDSCH and the second PDSCH are scheduled based on the UE capability information.

In an embodiment, wherein the unicast PDSCH comprises a dynamically scheduled unicast PDSCH or a unicast semi-persistent scheduling (SPS) PDSCH, wherein the group-common PDSCH comprises a dynamically scheduled group-common PDSCH or a group-common SPS PDSCH.

In an embodiment, a method performed by base station in a wireless communication system, the method comprising receiving, from a user equipment (UE), UE capability information indicating that the UE supports a frequency division multiplexing (FDM) between a unicast physical downlink shared channel (PDSCH) and a group-common PDSCH in a slot and transmitting, to the UE, a first PDSCH that is the unicast PDSCH and a second PDSCH that is the group-common PDSCH, which are FDMed in the slot based on the UE capability information.

In an embodiment, wherein the group-common PDSCH comprises a multicast PDSCH.

In an embodiment, wherein the group-common PDSCH comprises a broadcast PDSCH.

In an embodiment, wherein the first PDSCH and the second PDSCH are scheduled based on the UE capability information.

In an embodiment, wherein the unicast PDSCH comprises a dynamically scheduled unicast PDSCH or a unicast semi-persistent scheduling (SPS) PDSCH, wherein the group-common PDSCH comprises a dynamically scheduled group-common PDSCH or a group-common SPS PDSCH.

In an embodiment, a user equipment (UE) in a wireless communication system, the UE comprising a transceiver and at least one processor coupled with the transceiver and configured to transmit, to a base station, UE capability information indicating that the UE supports a frequency division multiplexing (FDM) between a unicast physical downlink shared channel (PDSCH) and a group-common PDSCH in a slot and receive, from the base station, a first PDSCH that is the unicast PDSCH and a second PDSCH that is the group-common PDSCH, which are FDMed in the slot based on the UE capability information.

In an embodiment, wherein the group-common PDSCH comprises a multicast PDSCH.

In an embodiment, wherein the group-common PDSCH comprises a broadcast PDSCH.

In an embodiment, wherein the first PDSCH and the second PDSCH are scheduled based on the UE capability information.

In an embodiment, wherein the unicast PDSCH comprises a dynamically scheduled unicast PDSCH or a unicast semi-persistent scheduling (SPS) PDSCH, wherein the group-common PDSCH comprises a dynamically scheduled group-common PDSCH or a group-common SPS PDSCH.

In an embodiment, a base station in a wireless communication system, the UE comprising: a transceiver and at least one processor coupled with the transceiver and configured to receive, from a user equipment (UE), UE capability information indicating that the UE supports a frequency division multiplexing (FDM) between a unicast physical downlink shared channel (PDSCH) and a group-common PDSCH in a slot and transmit, to the UE, a first PDSCH that is the unicast PDSCH and a second PDSCH that is the group-common PDSCH, which are FDMed in the slot based on the UE capability information.

In an embodiment, wherein the group-common PDSCH comprises a multicast PDSCH.

In an embodiment, wherein the group-common PDSCH comprises a broadcast PDSCH.

In an embodiment, wherein the first PDSCH and the second PDSCH are scheduled based on the UE capability information.

In an embodiment, wherein the unicast PDSCH comprises a dynamically scheduled unicast PDSCH or a unicast semi-persistent scheduling (SPS) PDSCH, wherein the group-common PDSCH comprises a dynamically scheduled group-common PDSCH or a group-common SPS PDSCH.

Those skilled in the art will understand that the above illustrative embodiments are described herein and are not intended to be limiting. It should be understood that any two or more of the embodiments disclosed herein may be combined in any combination. Furthermore, other embodiments may be utilized and other changes may be made without departing from the spirit and scope of the subject matter presented herein. It will be readily understood that aspects of the disclosure as generally described herein and shown in the drawings may be arranged, replaced, combined, separated and designed in various different configurations, all of which are contemplated herein.

Those skilled in the art will understand that the various illustrative logical blocks, modules, circuits, and steps described in this application may be implemented as hardware, software, or a combination of both. To clearly illustrate this interchangeability between hardware and software, various illustrative components, blocks, modules, circuits, and steps are generally described above in the form of their functional sets. Whether such function sets are implemented as hardware or software depends on the specific application and the design constraints imposed on the overall system. Technicians may implement the described functional sets in different ways for each specific application, but such design decisions should not be interpreted as causing a departure from the scope of this application.

In the above-described embodiments of the disclosure, all operations and messages may be selectively performed or may be omitted. In addition, the operations in each embodiment do not need to be performed sequentially, and the order of operations may vary. Messages do not need to be transmitted in order, and the transmission order of messages may change. Each operation and transfer of each message can be performed independently.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system. The various illustrative logic blocks, modules, and circuits described in this application may be implemented or performed by a general purpose processor, a Digital Signal Processor (DSP), an Application Specific Integrated Circuit (ASIC), a Field Programmable Gate Array (FPGA) or other programmable logic devices, discrete gates or transistor logics, discrete hardware components, or any combination thereof designed to perform the functions described herein. The general purpose processor may be a microprocessor, but in an alternative, the processor may be any conventional processor, controller, microcontroller, or state machine. The processor may also be implemented as a combination of computing devices, such as a combination of a DSP and a microprocessor, a plurality of microprocessors, one or more microprocessors cooperating with a DSP core, or any other such configuration.

The steps of the method or algorithm described in this application may be embodied directly in hardware, in a software module executed by a processor, or in a combination thereof. The software module may reside in RAM memory, flash memory, ROM memory, EPROM memory, EEPROM memory, register, hard disk, removable disk, or any other form of storage medium known in the art. A storage medium is coupled to a processor to enable the processor to read and write information from/to the storage media. In an alternative, the storage medium may be integrated into the processor. The processor and the storage medium may reside in an ASIC. The ASIC may reside in a user terminal. In an alternative, the processor and the storage medium may reside in the user terminal as discrete components.

In one or more designs, the functions may be implemented in hardware, software, firmware, or any combination thereof. If implemented in software, each function may be stored as one or more pieces of instructions or codes on a computer-readable medium or delivered through it. The computer-readable medium includes both a computer storage medium and a communication medium, the latter including any medium that facilitates the transfer of computer programs from one place to another. The storage medium may be any available medium that can be accessed by a general purpose or special purpose computer.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:

transmitting, to a base station, UE capability information including first information, second information, and third information, wherein the first information indicates that the UE supports a frequency division multiplexing (FDM) between a first unicast physical downlink shared channel (PDSCH) and a first group-common PDSCH in a first slot, the second information indicates a maximum number of second unicast PDSCHs and second multicast PDSCHs multiplexed based on a time division multiplexing (TDM) in a second slot, and the third information indicates that the UE is configured to receive either a third unicast PDSCH or a third group-common PDSCH in a third slot based on a predefined condition in case of a collision between the third unicast PDSCH and the third group-common PDSCH;

receiving, from the base station, the first unicast PDSCH and the first group-common PDSCH FDMed in the first slot based on the first information;

receiving, from the base station, the second unicast PDSCHs and the second multicast PDSCH TDMed in the second slot based on the second information; and receiving, from the base station, the third unicast PDSCH or the third group-common PDSCH colliding in the third slot based on the predefined condition.

2. The method of claim 1, wherein the first group-common PDSCH includes a multicast PDSCH.

3. The method of claim 1, wherein the first group-common PDSCH includes a broadcast PDSCH.

4. The method of claim 1, wherein the first unicast PDSCH includes a dynamically scheduled unicast PDSCH or a unicast semi-persistent scheduling (SPS) PDSCH, and wherein the first group-common PDSCH includes a dynamically scheduled group-common PDSCH or a group-common SPS PDSCH.

5. A method performed by base station in a wireless communication system, the method comprising:

receiving, from a user equipment (UE), UE capability information including first information, second information, and third information, wherein the first information mation indicates that the UE supports a frequency division multiplexing (FDM) between a first unicast physical downlink shared channel (PDSCH) and a first group-common PDSCH in a first slot, the second information indicates a maximum number of second unicast PDSCHs and second multicast PDSCHs multiplexed based on a time division multiplexing (TDM) in a second slot, and the third information indicates that the UE is configured to receive either a third unicast PDSCH or a third group-common PDSCH in a third slot based on a predefined condition in case of a collision between the third unicast PDSCH and the third group-common PDSCH;

transmitting, to the UE, the first unicast PDSCH and the first group-common PDSCH FDMed in the first slot based on the first information;

transmitting, to the UE, the second unicast PDSCHs and the second multicast PDSCH TDMed in the second slot based on the second information; and transmitting, to the UE, the third unicast PDSCH or the third group-common PDSCH colliding in the third slot based on the predefined condition.

6. The method of claim 5, wherein the first group-common PDSCH includes a multicast PDSCH.

7. The method of claim 5, wherein the first group-common PDSCH includes a broadcast PDSCH.

8. The method of claim 5, wherein the first unicast PDSCH includes a dynamically scheduled unicast PDSCH or a unicast semi-persistent scheduling (SPS) PDSCH, and wherein the first group-common PDSCH includes a dynamically scheduled group-common PDSCH or a group-common SPS PDSCH.

9. A user equipment (UE) comprising:

at least one transceiver;

at least one processor communicatively coupled to the at least one transceiver; and at least one memory, communicatively coupled to the at least one processor, storing instructions executable by the at least one processor individually or in any combination to cause the UE to:

transmit, to a base station, UE capability information including first information, second information, and third information, wherein the first information indicates that the UE supports a frequency division multiplexing (FDM) between a first unicast physical downlink shared channel (PDSCH) and a first group-common PDSCH in a first slot, the second information indicates a maximum number of second unicast PDSCHs and second multicast PDSCHs multiplexed based on a time division multiplexing (TDM) in a second slot, and the third information indicates that the UE is configured to receive either a third unicast PDSCH or a third group-common PDSCH in a third slot based on a predefined condition in case of a collision between the third unicast PDSCH and the third group-common PDSCH, receive, from the base station, the first unicast PDSCH and the first group-common PDSCH FDMed in the first slot based on the first information, receive, from the base station, the second unicast PDSCHs and the second multicast PDSCH TDMed in the second slot based on the second information, and receive, from the base station, the third unicast PDSCH or the third group-common PDSCH colliding in the third slot based on the predefined condition.

10. The UE of claim 9, wherein the first group-common PDSCH includes a multicast PDSCH.

11. The UE of claim 9, wherein the first group-common PDSCH includes a broadcast PDSCH.

12. The UE of claim 9, wherein the first unicast PDSCH includes a dynamically scheduled unicast PDSCH or a unicast semi-persistent scheduling (SPS) PDSCH, and wherein the first group-common PDSCH includes a dynamically scheduled group-common PDSCH or a group-common SPS PDSCH.

13. A base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

receive, from a user equipment (UE), UE capability information including first information, second information, and third information, wherein the first information indicates that the UE supports a frequency division multiplexing (FDM) between a first unicast physical downlink shared channel (PDSCH) and a first group-common PDSCH in a first slot, the second information indicates a maximum number of second unicast PDSCHs and second multicast PDSCHs multiplexed based on a time division multiplexing (TDM) in a second slot, and the third information indicates that the UE is configured to receive either a third unicast PDSCH or a third group-common PDSCH in a third slot based on a predefined condition in case of a collision between the third unicast PDSCH and the third group-common PDSCH, transmit, to the UE, the first unicast PDSCH and the first group-common PDSCH FDMed in the first slot based on the first information, transmit, to the UE, the second unicast PDSCHs and the second multicast PDSCH TDMed in the second slot based on the second information, and transmit, to the UE, the third unicast PDSCH or the third group-common PDSCH colliding in the third slot based on the predefined condition.

14. The base station of claim 13, wherein the first group-common PDSCH includes a multicast PDSCH.

15. The base station of claim 13, wherein the first group-common PDSCH includes a broadcast PDSCH.

16. The base station of claim 13, wherein the first unicast PDSCH includes a dynamically scheduled unicast PDSCH or a unicast semi-persistent scheduling (SPS) PDSCH, and wherein the first group-common PDSCH includes a dynamically scheduled group-common PDSCH or a group-common SPS PDSCH.

* * * * *